(12) United States Patent
Giustino et al.

(10) Patent No.: US 7,171,848 B2
(45) Date of Patent: Feb. 6, 2007

(54) TIRE STATUS DETECTION SYSTEM AND METHOD

(75) Inventors: James Michael Giustino, Waxhaw, NC (US); Alan Roger Bichler, Charlotte, NC (US); Marius Goslar, Braunschweig (DE); Robert Yen Liu, Charlotte, NC (US); Thomas Becherer, Burgwedel (DE)

(73) Assignee: Continental Tire North America, Inc., Charlotte, NC (US)

( * ) Notice: Subject to any disclaimer, the term of this patent is extended or adjusted under 35 U.S.C. 154(b) by 498 days.

(21) Appl. No.: 10/412,632

(22) Filed: Apr. 11, 2003

(65) Prior Publication Data

US 2004/0200273 A1 Oct. 14, 2004

Related U.S. Application Data

(60) Provisional application No. 60/371,884, filed on Apr. 11, 2002.

(51) Int. Cl.
*G01M 17/02* (2006.01)

(52) U.S. Cl. ........................................................ 73/146
(58) Field of Classification Search .................. 73/146; 324/166; 152/523
See application file for complete search history.

(56) References Cited

U.S. PATENT DOCUMENTS

| | | | | |
|---|---|---|---|---|
| 5,895,854 A | * | 4/1999 | Becherer et al. | 73/514.39 |
| 5,913,240 A | * | 6/1999 | Drahne et al. | 73/146 |
| 5,926,017 A | * | 7/1999 | Von Grunberg et al. | 324/166 |
| 5,964,265 A | * | 10/1999 | Becherer | 152/152.1 |
| 6,161,431 A | * | 12/2000 | Drahne et al. | 73/146 |
| 6,308,758 B1 | * | 10/2001 | Cetin et al. | 152/523 |
| 6,550,320 B1 | * | 4/2003 | Giustino | 73/146 |

FOREIGN PATENT DOCUMENTS

| | | |
|---|---|---|
| EP | 1186853 | 3/2002 |
| JP | 2000121654 | 4/2000 |
| WO | 0119655 | 3/2001 |

OTHER PUBLICATIONS

"Conti Sur La Voie Du Pneu Intelligent Avec Le SWT", *Ingenieurs De L'Automobile, Raip.*, Boulogne, France, No. 728, Apr. 1999, pp. 36–39.

* cited by examiner

*Primary Examiner*—Edward Lefkowitz
*Assistant Examiner*—Andre Allen
(74) *Attorney, Agent, or Firm*—Calfee, Halter & Griswold LLP

(57) ABSTRACT

A system and method for detecting changes in tire status in real time, e.g., changes in tire pressure or changes that might indicate an imminent tread separation or other failure, using magnetic sidewall torsion (SWT) signatures for tires. A measured magnetic signature of a tire is compared to a stored magnetic signature that describes the tire in an undamaged state or otherwise acceptable state. If the measured magnetic signature deviates too much from the stored signature, or if a change in tire pressure is detected, the system and method can further provide an associated warning to the driver and/or provide an input to a vehicle control system, which would automatically take action to correct or at least mitigate the effects of the failing tire, e.g., by decelerating the vehicle.

35 Claims, 24 Drawing Sheets

TIRE STATUS DETECTION SYSTEM AND METHOD

CROSS-REFERENCE TO RELATED APPLICATIONS

This application claims priority to and the benefit of U.S. Provisional Application Ser. No. 60/371,884, filed on Apr. 11, 2002. This application is believed to be related to the following issued patents and pending applications, all if which are hereby incorporated herein by reference in their entirety: U.S. Pat. Nos. 5,895,854; 5,913,240; 5,926,017; 5,964,265; 6,161,431; and 6,308,758; and U.S. patent application Ser. No. 09/584,230, now U.S. Pat. No. 6,550,320. This application is also believed to be related to the following pending applications: U.S. patent application Ser. Nos. 60/462,449; 10/822,551; 10/797,525; 10/412,632; and 10/336,887.

FIELD OF THE INVENTION

The present invention relates generally to the field of tire dynamics and more specifically to detecting changes in tire status, e.g., changes in tire pressure and changes that might indicate an imminent tread separation or other failure, using measurements of tire deformations.

BACKGROUND OF THE INVENTION

U.S. Pat. Nos. 5,895,854 and 6,308,758 and copending U.S. patent application Ser. No. 09/584,230 disclose a vehicle wheel that is provided with a pneumatic (rubber) tire having at least at one predetermined location a rubber mixture that is permeated with magnetizable particles that have been magnetized. As stated in that patent, the tire disclosed therein can be used in a slip regulation system. Preferably, the magnetized locations are located in one or more annular bands in the sidewall of the tire, i.e., in the longitudinal or peripheral direction, and have successive zones of different magnetization in one or more rows disposed at different radii along the peripheral direction of the tire. One expressly stated object of the '854 patent was to provide a vehicle wheel having a pneumatic (rubber) tire, with the aid of which the information required for operating a modem vehicle, e.g. wheel rotational speed for ABS (Anti-lock Brake system) and/or longitudinal forces (torsional forces) that act upon the tire for regulating slipping, can be made available.

According to that patent, the generated magnetization and the spatial magnetization differences could be detected with magnetic field sensors and can serve as SWT sensor input signals (sidewall torsion sensor input signals) for slip regulating systems, especially also for SWT systems (sidewall torsion measuring systems). As further stated in that patent, it was previously thought that in order to be able to detect a change of the time span between the passes of the two marks (in one row for ABS or in two rows for SWT) as precisely as possible, it was desired that the magnetization in the peripheral direction be effected as quadrilaterally as possible, i.e. that the magnetization should be substantially homogeneous within a cohesive region (code bars), and above all at the boundaries of this region should change with as great a gradient as possible. In contrast, it was stated that for the conventional ABS systems that detected the wheel rotations, it was sufficient if the magnetization in the peripheral direction of the tire be effected in a sinusoidal manner.

Thus, a primary function of the SWT system using the SWT sensor has always been to measure the torsional deformation in the tangential direction of the tire and use that torsional deformation to calculate the applied driving or braking torque. Copending U.S. patent application Ser. No. 09/584,230, provide a system and method for decoupling the lateral and tangential forces acting on the tire to allow the SWT sensor to be used to effectively measure longitudinal torque, and also to predict the lateral force and other forces and torques acting on the tire using the SWT sensors.

Because of the unique construction of each tire, e.g., locations of various splices, minute differences in material thicknesses, each tire has its own magnetic field sidewall "fingerprint" or "signature" that can be detected by the SWT magnetic sensors. These signatures may be, but are not necessarily, unique for each tire. FIG. 1 shows one such tire signature showing, for one revolution of the tire, magnetic field plotted against pole number around the circumference of the magnetized region of the tire. FIG. 1 indicates generally the physical characteristic of the tire responsible for some of the more dramatic features of that particular signature: the builder splice, the sidewall splice, and the stock preparation splice. This signature repeats every revolution of the tire. In the applications of the SWT systems mentioned above, including the systems and methods in patent application Ser. No. 09/584,230, the individual features of this signature were essentially ignored as part of determining the forces acting on the tire.

SUMMARY OF THE INVENTION

According to the present invention, it was discovered that this unique magnetic field sidewall signature for each tire need not be ignored or treated as noise, but that changes in the signature for a given tire can be indicative of a change in tire status, e.g., imminent tire failure, as may be caused by, e.g., cuts, punctures, pinholes, tread separation, sidewall anomalies (e.g., scraping the sidewall on a curb, a sidewall bubble, and sidewall "unzipping"), etc. and that an early warning of imminent tire failure can be provided by detecting changes in a tire's magnetic field sidewall signature. It was also discovered that as a tire ages, its magnetic field sidewall signature stays essentially the same, with different DC offsets. It was even discovered that some imminent tire failures on one side of a tire can be detected by changes in the tire's magnetic field sidewall signature on the other side of the tire.

Thus, the present invention provides a system and method for determining changes in tire status by detecting changes in the tire's magnetic field sidewall signature. In general, in the system and method, the current magnetic signature of a tire is compared to a stored magnetic signature that describes the tire in an undamaged state. If the current magnetic signature deviates too much from the stored signature, the system and method can further provide an associated warning to the driver and/or provide an input to a vehicle control system, which would automatically take action to correct or at least mitigate the effects of the failing tire, e.g., decelerating the vehicle.

It is therefore an advantage of the present invention to provide a system and method for determining changes in a tire's status using tire deformation sensors, e.g., SWT sensors.

It is also an advantage of the present invention to provide a system and method for determining imminent tire failure using tire deformation sensors, e.g., SWT sensors.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

Figure 2:
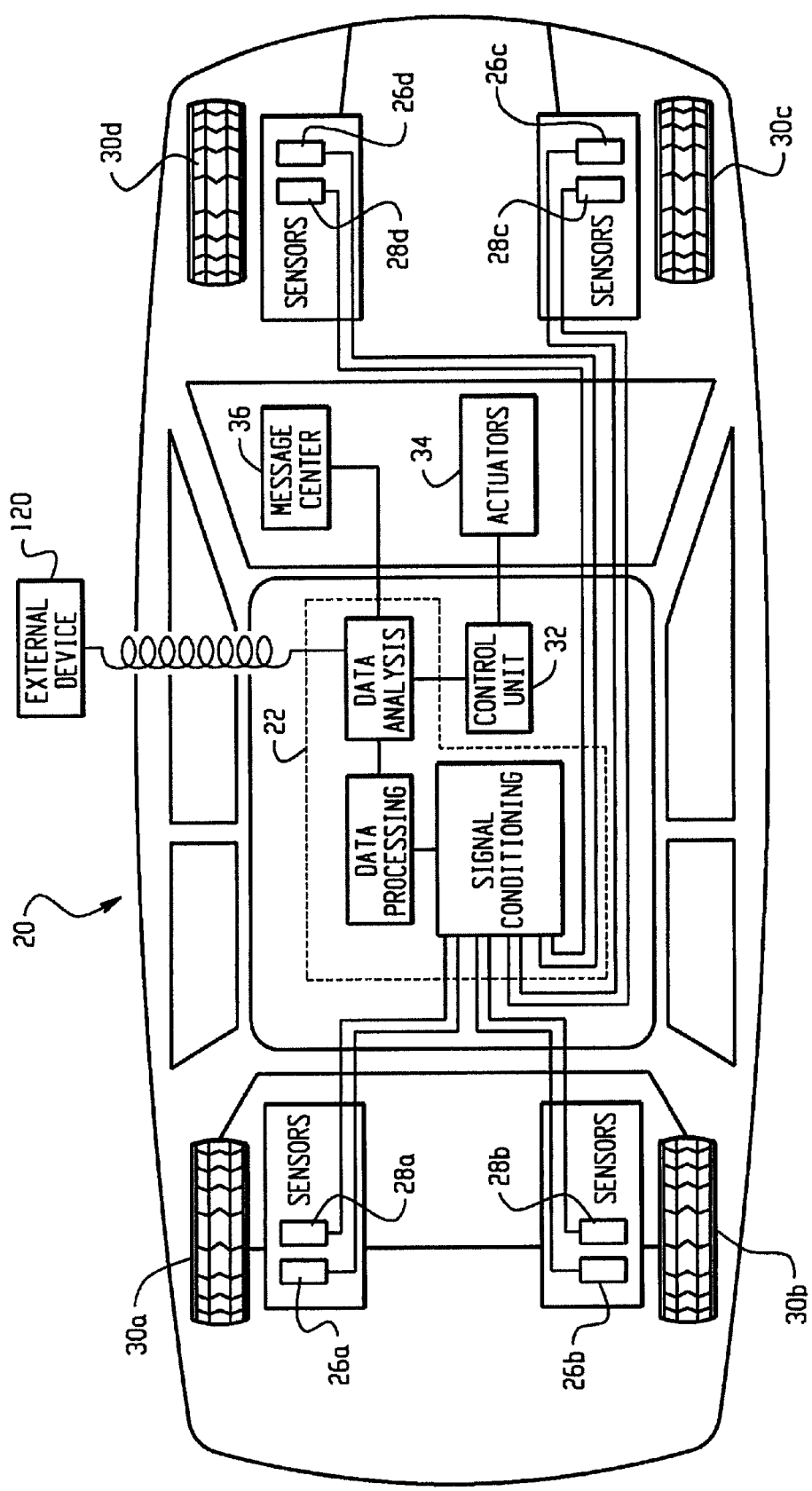
FIG. 2 is a schematic block diagram of a system according to the present invention.

Referring now to the Figures and initially to FIG. 2, a vehicle control system 20 according to the present invention is shown schematically. In the broadest sense, the vehicle control system 20 comprises a tire status detection unit 22 to be placed in circuit communication with at least one tire sidewall deformation sensor. "Circuit communication" as used herein is used to indicate a communicative relationship between devices. Direct electrical and optical connections and indirect electrical and optical connections are examples of circuit communication. Two devices are in circuit communication if a signal from one is received by the other, regardless of whether the signal is modified by some other device. For example, two devices separated by one or more of the following—transformers, optoisolators, digital or analog buffers, analog integrators, other electronic circuitry, fiber optic transceivers, or even satellites—are in circuit communication if a signal from one reaches the other, even though the signal is modified by the intermediate device(s). As a final example, two devices not directly connected to each other, but both capable of interfacing with a third device, e.g., a CPU, are in circuit communication. As used herein, "input" refers to either a signal or a value and "output" refers to either a signal or a value. Unless the context clearly indicates otherwise, the terms "signal" and "value" are used interchangeably herein. Preferably, the tire sidewall deformation sensor is a magnetic tire sidewall torsion (SWT) sensor. The tire status detection unit 22 has a preprogrammed processor (not shown) that receives input from the at least one SWT sensor and at least one other sensor input and performs data analysis by implementing preprogrammed equations having constants determined from previously collected data to determine tire status (or changes in tire status) from at least the SWT input. The tire status detection unit 22 may also perform any necessary signal conditioning (e.g., signal amplification, low pass filtering, and/or high pass filtering, as appropriate) and data processing associated with the SWT sensor.

With respect to FIG. 2, in a preferred embodiment, the tire status detection unit 22 is placed in circuit communication with a pair of magnetic SWT sensors 26, 28 for each tire 30 of the vehicle 20; however, the tire status detection unit 22 may be used with a single magnetic SWT sensor 26 for each tire 30 of the vehicle 20. Preferably, the tire status detection unit 22 is placed in circuit communication with a control unit 32, which is in circuit communication with and affects the dynamic state of the vehicle 20 via one or more actuators 34. Examples of control units 32 and actuators 34 known to those in the art include combinations and permutations of one or more of the following: an ABS control unit with braking actuators, a traction control system (TCS) control unit with braking and throttle actuators, an electronic stability control (ESC) (also known as an integrated vehicle dynamics (IVD) or ESP) control unit with braking and throttle actuators, a locked differential control unit, a suspension control unit, a brake assist control unit with braking actuators, an intelligent cruise control unit with vehicle throttle actuators, a steering assist control unit with steering actuators, a deflation detection control unit, a navigation control unit, a rollover prevention (also known as anti-rollover braking (ARB)) control unit, and a brake-by-wire control unit with braking actuators, all of which can be programmed to react to a detected change in tire status, e.g., by automatically reducing the engine speed and automatically applying a braking force to slow the vehicle. Significantly, these exemplary control units 32 and actuators 34 require one of more of the following sensors—a longitudinal accelerometer (for longitudinal force and/or acceleration), a lateral accelerometer (for lateral force and/or acceleration), a vertical load sensor, wheel speed sensors, and a yaw rate sensor, all of which can be replaced by one or more SWT sensors in accordance with copending U.S. patent application Ser. No. 09/584,230.

In addition, the preferred embodiment of the present invention includes a message center 36 that provides the driver with an indication of tire status or a change in tire status. By way of example but not of limitation, in accordance with the present invention, the message center 36 can provide visual and/or audible and/or other indications of one or more of the following to a driver: (i) a warning that one or more tires are not adequately inflated, (ii) a warning that one or more tires has a normal load that exceeds an acceptable threshold, (iii) a warning that a catastrophic tire failure is imminent.

The tire status detection unit 22 can be implemented with various combinations of analog and digital circuitry, processors, and the like. The control unit can be implemented with separate circuitry and/or processor(s) or with circuitry and/or processor(s) used to implement the tire status detection unit 22. Preferably, the data processing and data analysis portions of the tire status detection unit 22 are implemented in a single processor, with the signal conditioning being performed in dedicated analog circuitry (not shown).

The tire status detection unit 22 might need specific information about each tire 30 on the vehicle, e.g., nominal signature, number of magnetic poles, etc. Accordingly, the processor in the tire status detection unit 22 will need to have some way of obtaining that information about each tire. The tire status detection unit 22 can obtain this information in a number of ways, e.g., having one of the SWT sensors read a magnetic code (e.g., a preselected series of magnetic transitions in the form of a bar code or the like embedded into the tire sidewall) directly from the tire sidewall, communicating with an external device 120 such as a selectably connectable computer or interface pendant through which the tire type is selected or other information is entered, etc. In addition, or in the alternative, the tire status detection unit 22 can have communication circuitry to directly or indirectly receive tire information from an external device 120 such as a selectably connectable computer or an interface pendant.

Figure 3:
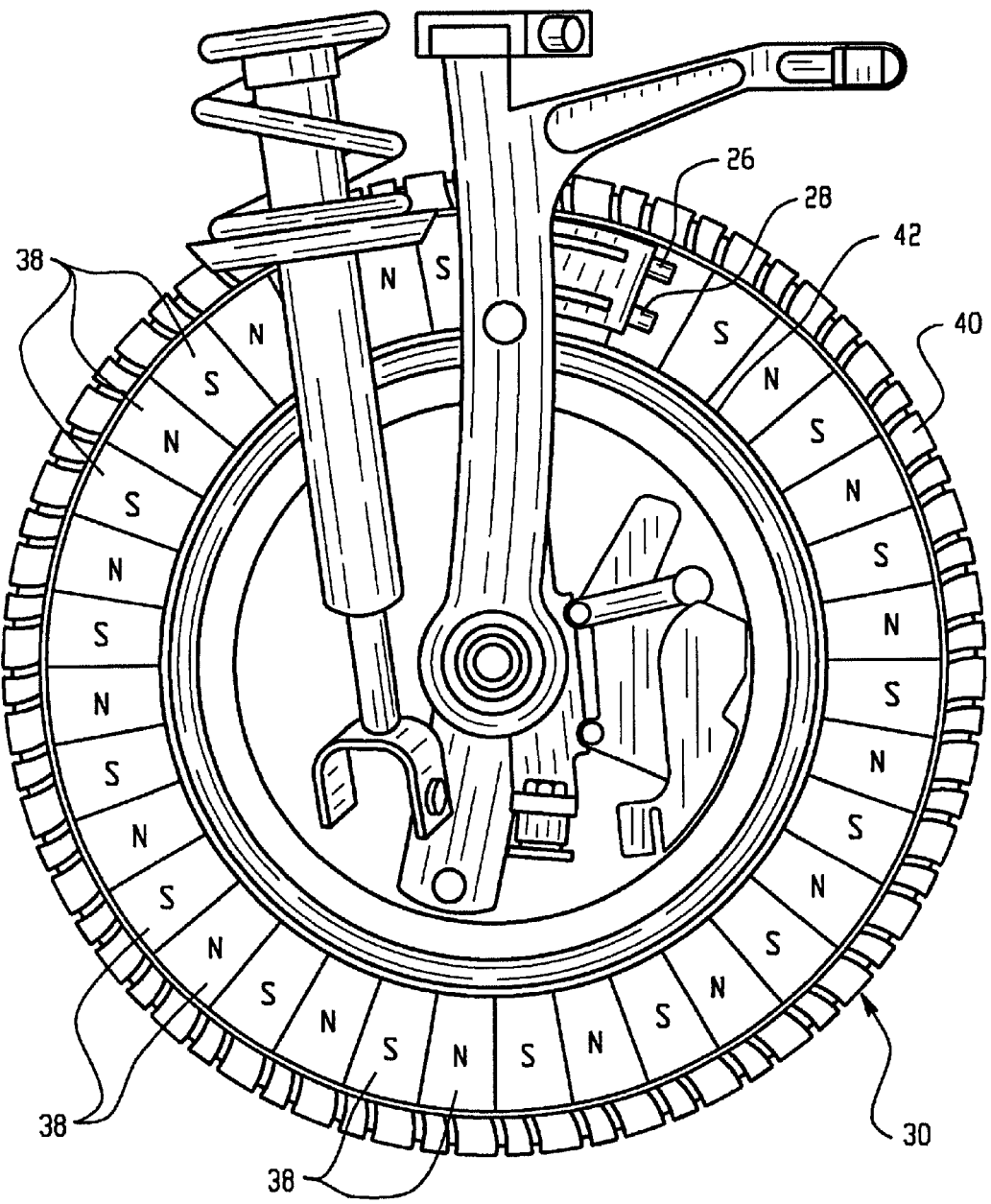
FIG. 3 is a side view of a tire having magnetic bands of alternating polarity and corresponding sensors used with the system and method of the present invention.

Referring now to FIG. 3, a pair of SWT sensors 26, 28 is shown schematically with the corresponding magnetic tire 30. As shown schematically in FIG. 3, the magnetic tire 30 used with the SWT sensors 26, 28 preferably has a number of alternating bands 38 of magnetic polarity. The magnetic tires 30 can be made in any number of ways, e.g., as taught in U.S. Pat. No. 5,895,854, as taught in U.S. Pat. No. 6,308,758, or in any number of other ways, e.g., providing alternating bands of premagnetized thin material, embedding adjacent alternating magnetic bands into the sidewall of a green tire, and curing the green tire. The SWT sensors 26, 28 themselves are preferably magnetic sensors, e.g., magneto-resistive (MR) sensors, Hall effect sensors, or flux gate sensors, positioned close enough to the magnetic regions of the sidewall of tire 30 to interact therewith. MR sensors have the advantages of allowing a moderate air gap and have been extensively tested. Flux gate sensors have the advantage of allowing an air gap of between one to two inches and have the further advantage of being able to be used in differential mode (e.g., flux gate sensors from Polak Co. in Massachusetts). Hall effect sensors have the disadvantage of requiring a relatively small air gap. If two SWT sensors are used, one sensor 26 is preferably positioned near the tread 40 and the other sensor 28 is preferably positioned near the bead 42. If only one SWT sensor is used, the SWT sensor 26 is preferably positioned closer to the tread 40 than the bead 42 to provide greater sensitivity.

Figure 4:
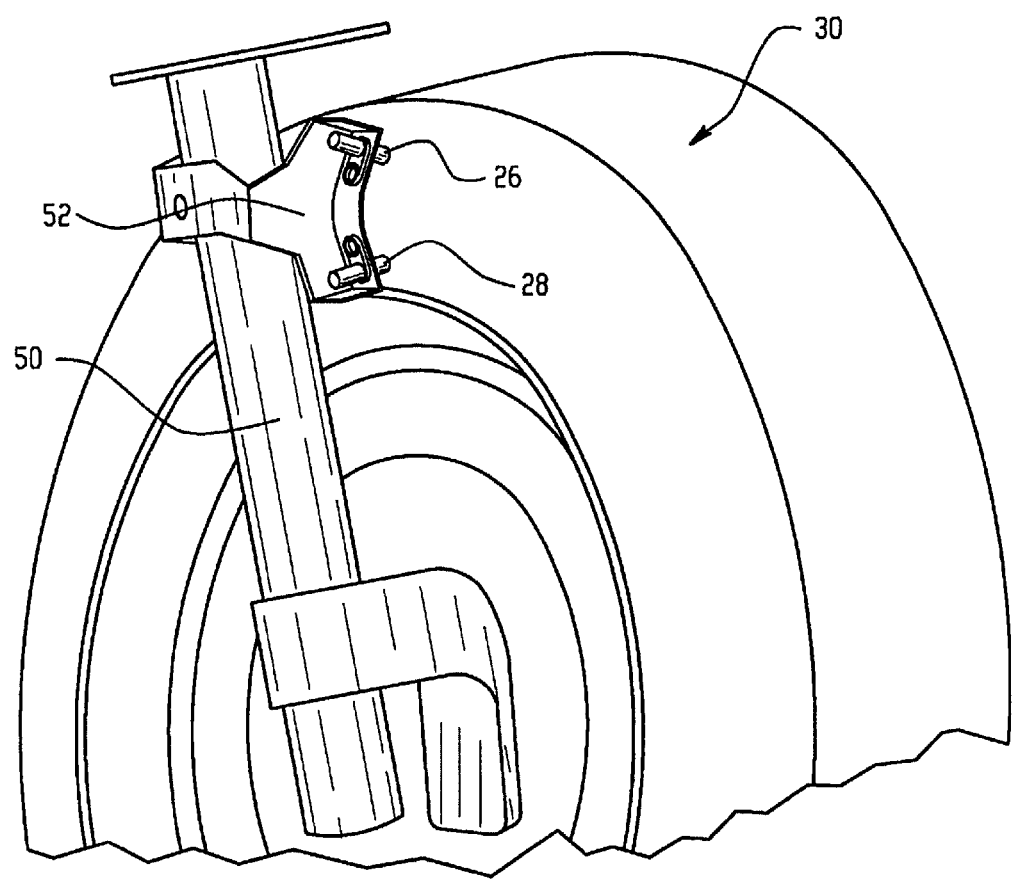
FIG. 4 is a perspective view of a mounting bracket fixed to a suspension strut and holding two magnetic sensors in close proximity to the magnetic sidewall of the tire.
Figure 5:
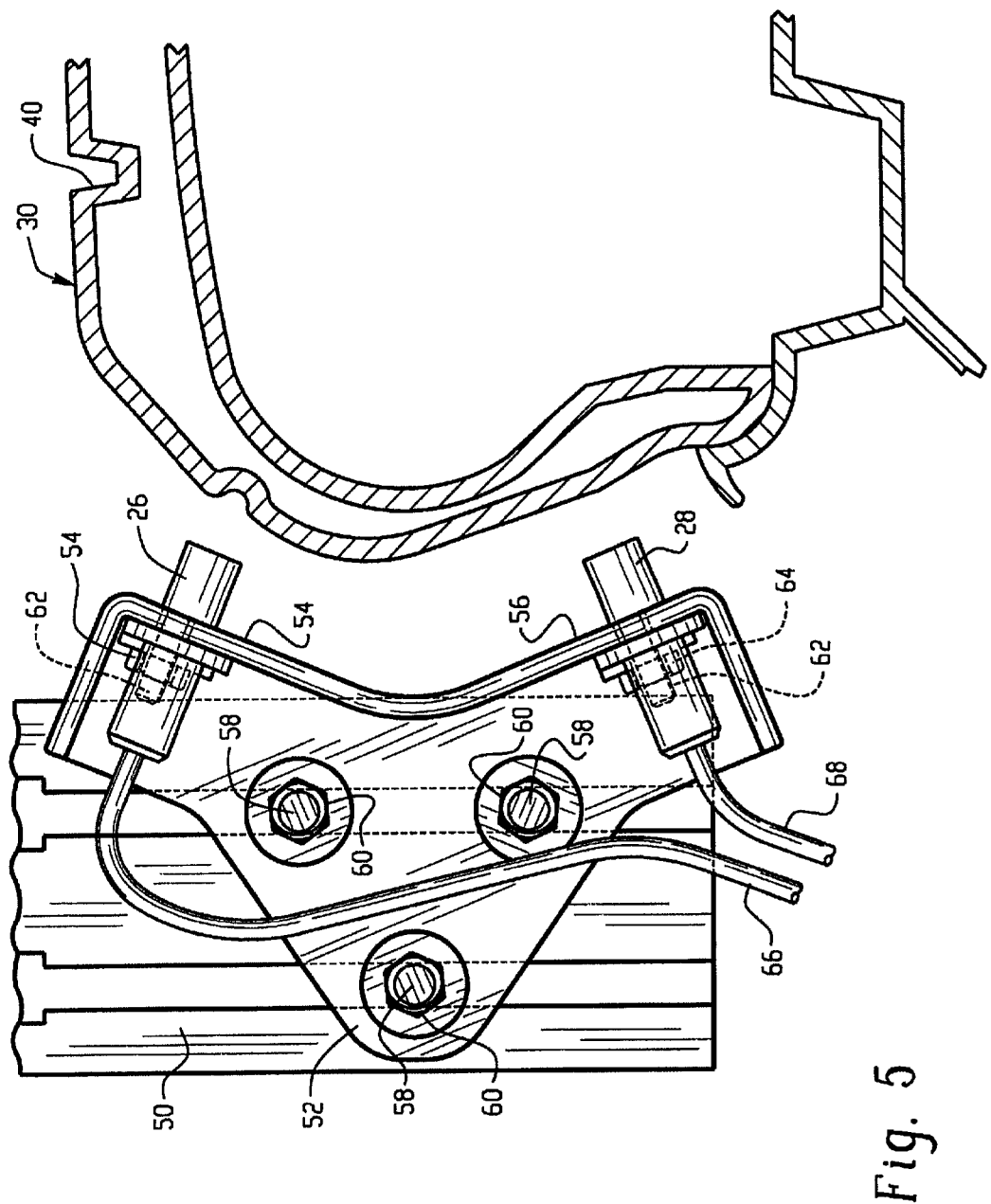
FIG. 5 is a close up view of the mounting bracket and sensors shown in FIG. 4 and FIG. 5' is a photograph of the mounting bracket and sensors from which FIG. 5 was based.

Referring now to FIG. 4 and FIG. 5, the mounting of the sensors 26, 28 to a vehicle suspension strut 50 is shown. Preferably the sensors 26, 28 are mounted to a suspension strut 50 via a mounting bracket 52. In FIG. 4 and FIG. 5, the sensors 26, 28 are model number KMZ10A magneto-resistive (MR) sensors, available from Philips. Mounting bracket 52 preferably is configured so that the flat end portion of hall effect sensors 26, 28 are substantially parallel to the sidewall of magnetic tire 30. Preferably, the flat end portion of MR sensors 26, 28 are 12.5 mm from the surface of the sidewall of magnetic tire 30 when there are no lateral forces acting on the tire 30. With lateral forces present, the air gap can be expected to range from about 8 mm to about 25 mm. Because the sidewall of a tire typically has a pronounced curvature, the mounting bracket 52 preferably provides a pair of skewed (i.e., not parallel) surfaces 54, 56 for the sensors 26, 28 respectively. The mounting bracket 52 may be secured to suspension strut 50 by any suitable means, such as integrally forming mounting bracket 52 with strut 50, using suitable fasteners, e.g., bolts 58 and nuts 60 as shown in FIGS. 4 and 5, or by any other suitable means. The sensors 26, 28 may be secured to mounting bracket 52 by any suitable means, such as using suitable fasteners, e.g., bolts 62 and nuts 64 as shown in FIGS. 4 and 5, or by any other suitable means. Wires 66, 68 place sensors 26, 28 in circuit communication with the tire status detection unit 22.

The sensors 26, 28 in FIG. 4 and FIG. 5 are positioned at the 180° location (at the 12 o'clock position). For purposes of the present invention, i.e., for determining changes in tire status, the one required sensor may be positioned virtually anywhere around the circumference of the tire proximate the magnetized portion of the tire, e.g., at the 90° location.

Figure 1:
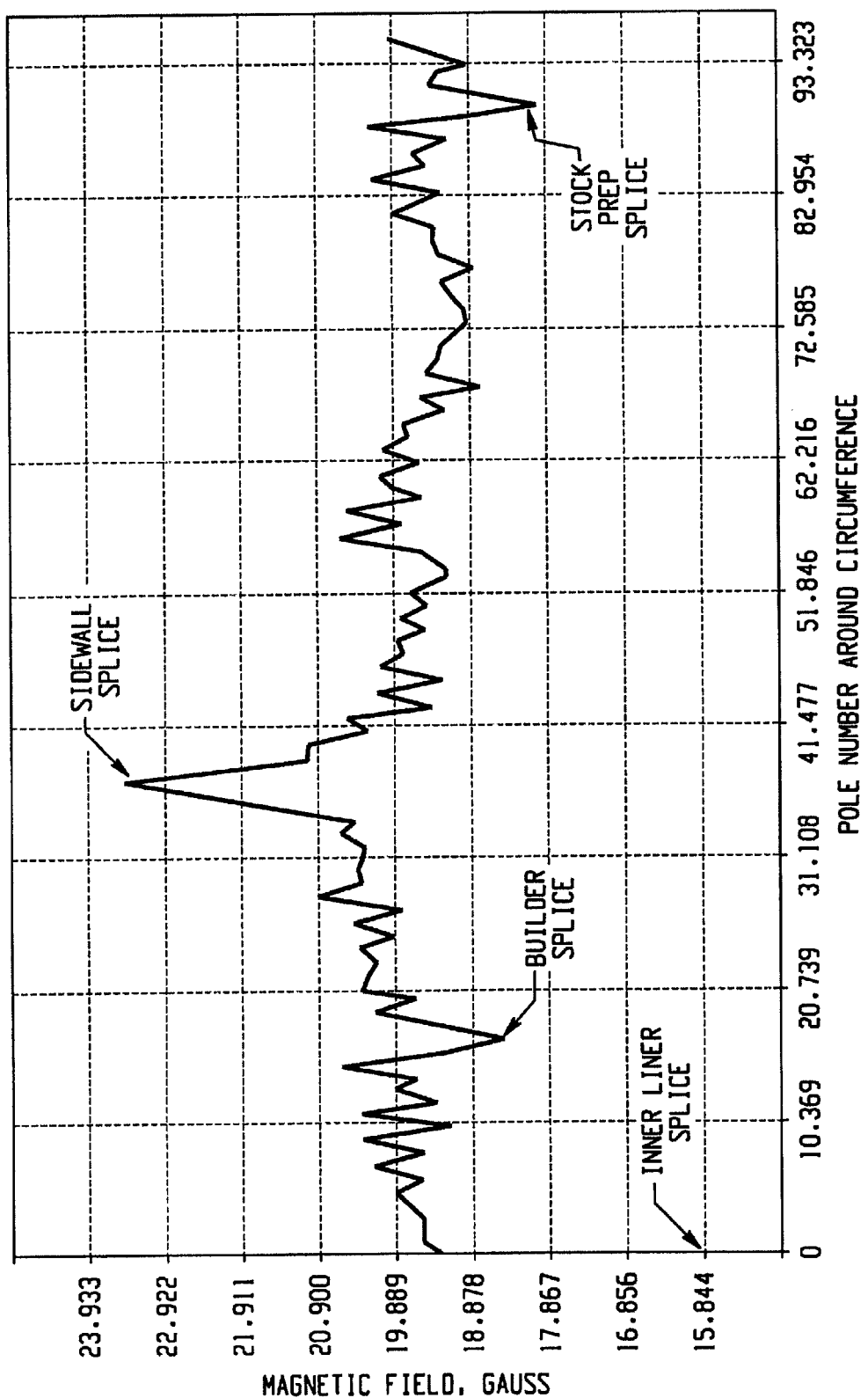
FIG. 1 is an example of a magnetic field sidewall "fingerprint" or "signature" detected by an SWT magnetic sensor (magnetic field in Gauss plotted against pole number around the circumference of the annular magnetic sidewall for one revolution of the tire)

The tire status detection unit 22 preferably accepts as inputs at least an amplitude input from the outer magnetic sensor 26 relating to (and preferably representing) the length of the changing air gap between the sensor 26 and the sidewall. Magnetic signatures for each tire 30 (like those shown in FIG. 1) are preferably digitized and used by tire status detection unit 22 to determine tire status and/or changes in tire status. More preferably, the tire status detection unit 22 also accepts as additional inputs (a) a value relating to (and preferably representing) the speed of the vehicle (which can be determined from the period of each region of one of the SWT sensors, inverted and scaled by the radius of the tire) and (b) values related to (and preferably representing) the lateral force acting on each tire (which can be determined as taught in copending U.S. patent application Ser. No. 09/584,230). The speed input allows the tire status detection unit to take into account the effects on the sidewall of centrifugal forces at higher speeds and the effects of relaxation phenomenon on the tire the at lower speeds. The lateral force inputs allows the tire status detection unit to determine with higher confidence whether a change in a tire's signature is a result of a change in the tire's physical structure or the result of some dynamic force acting on the tire.

Figure 6:
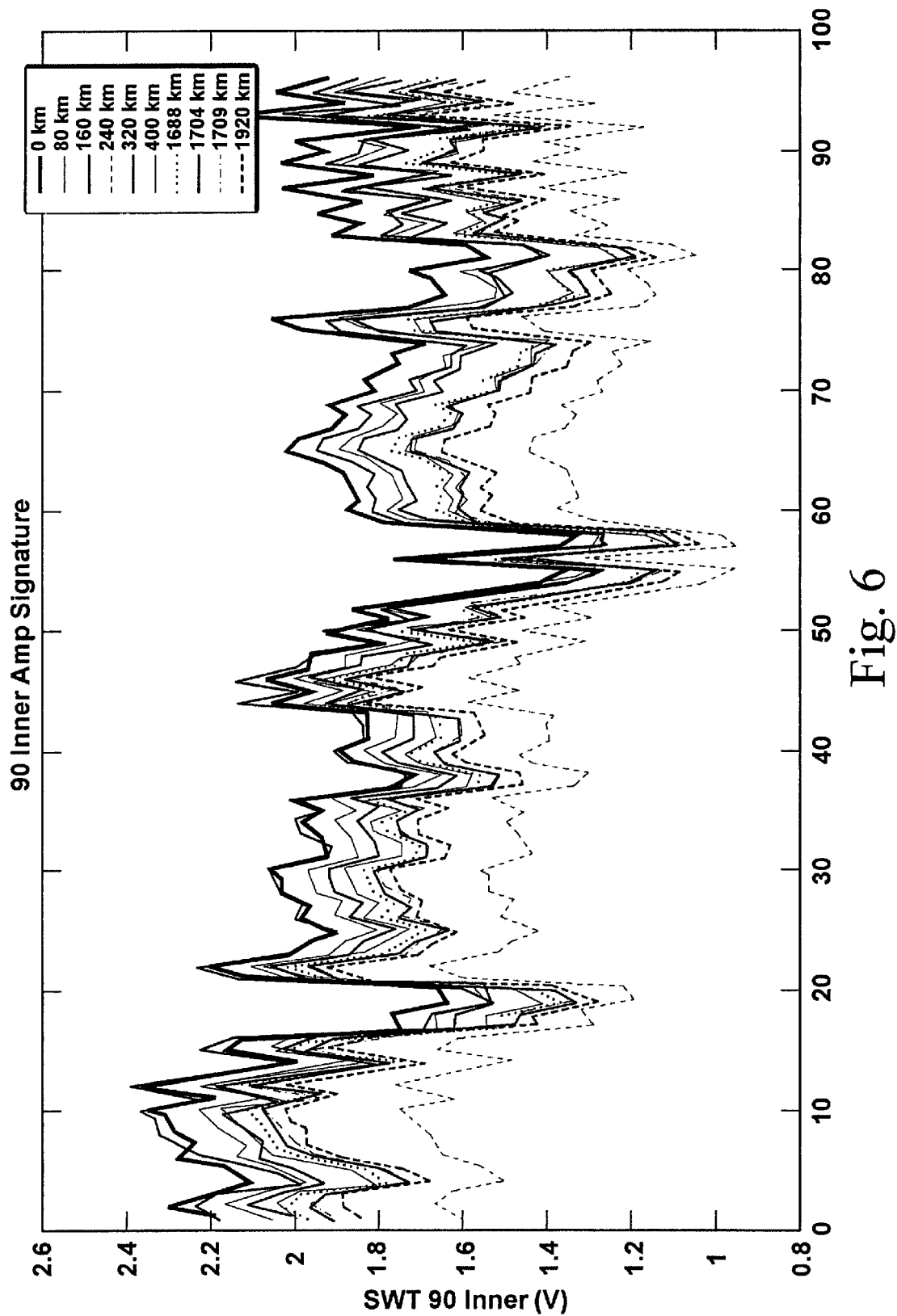
FIGS. 6–9 are pluralities of magnetic signatures (data plots of SWT sensor voltage amplitude plotted against pole number around the circumference of the magnetized region of the tire) taken at various break-in mileages for a tire.
Figure 7:
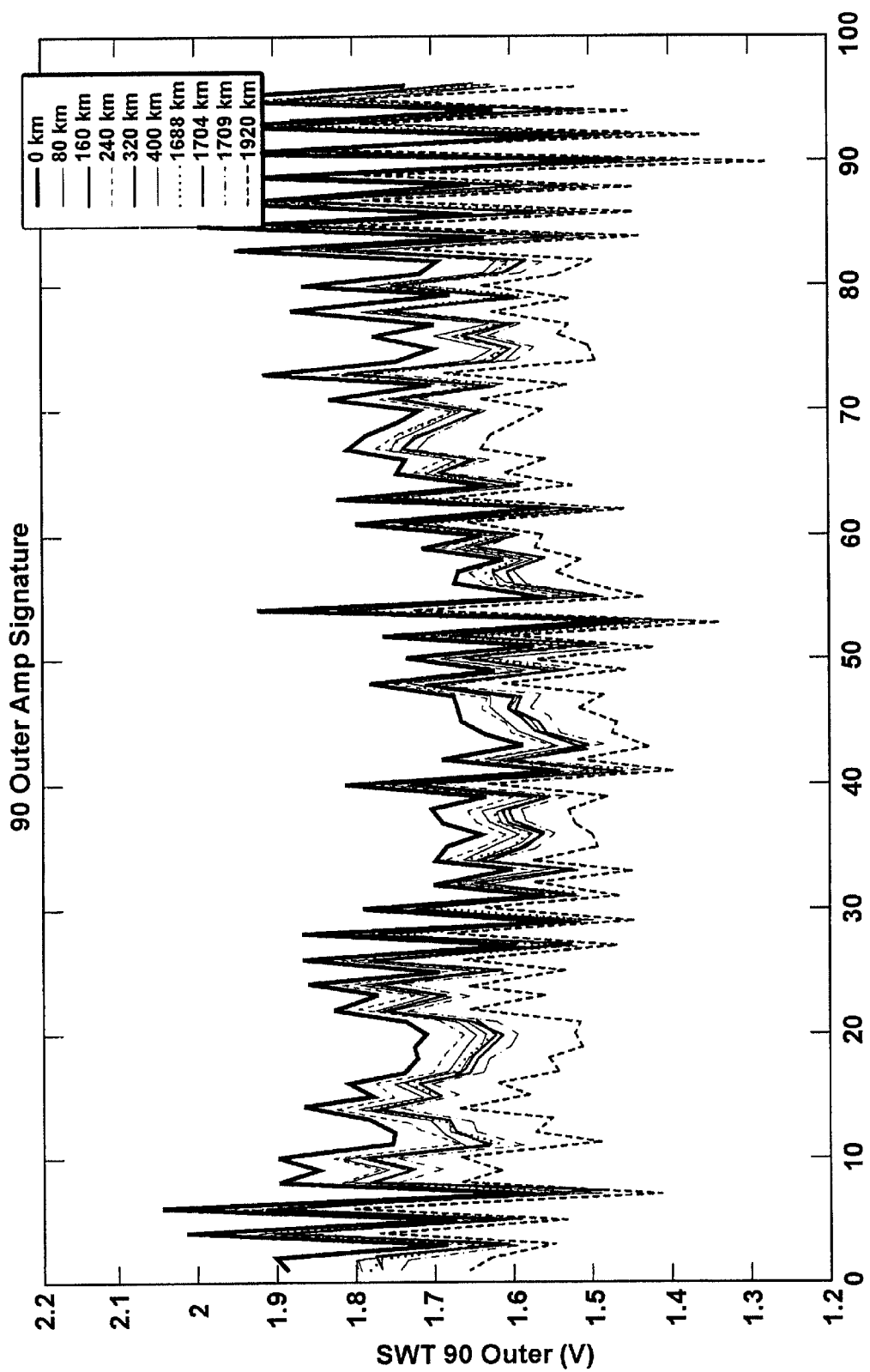
Figure 8:
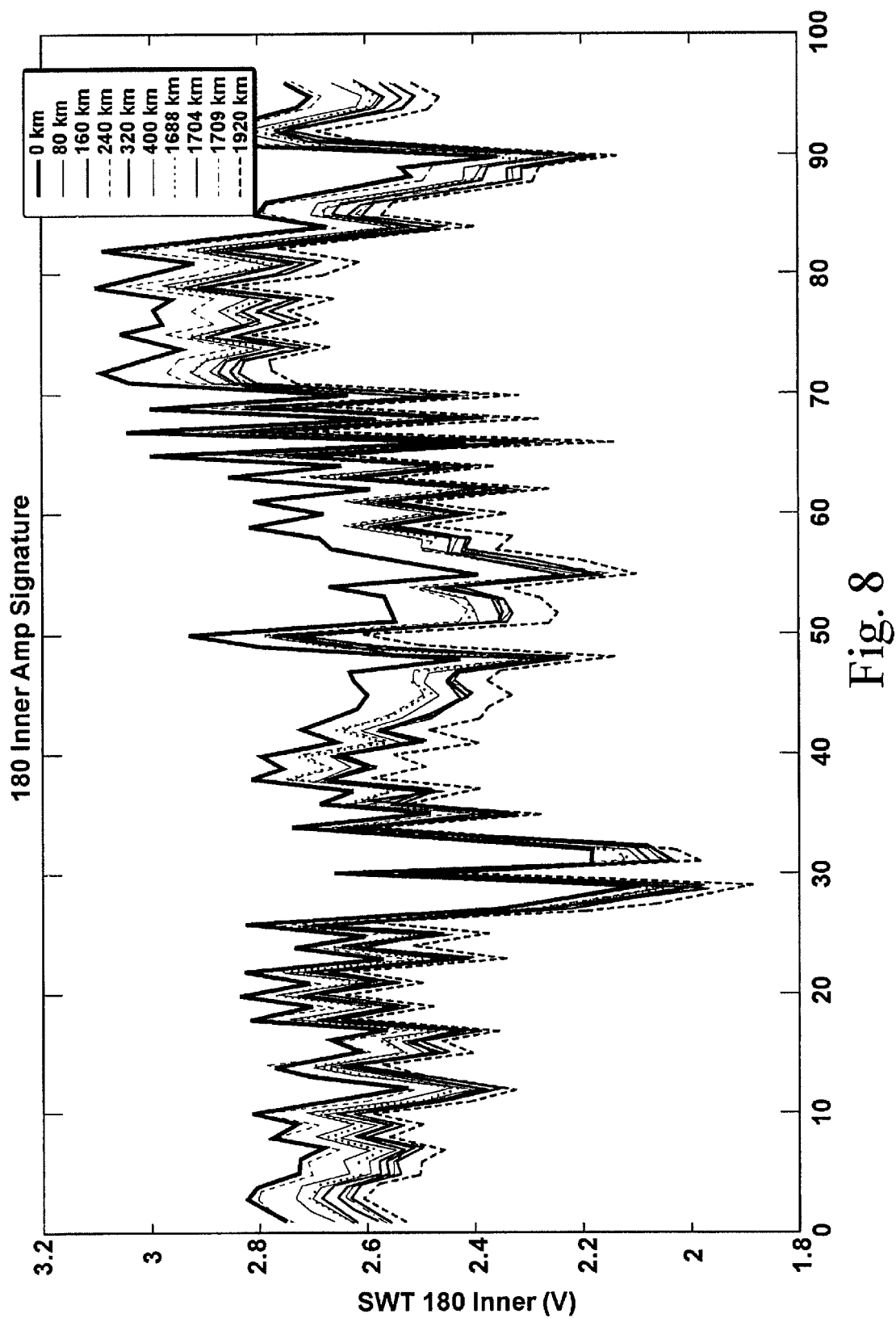
Figure 9:
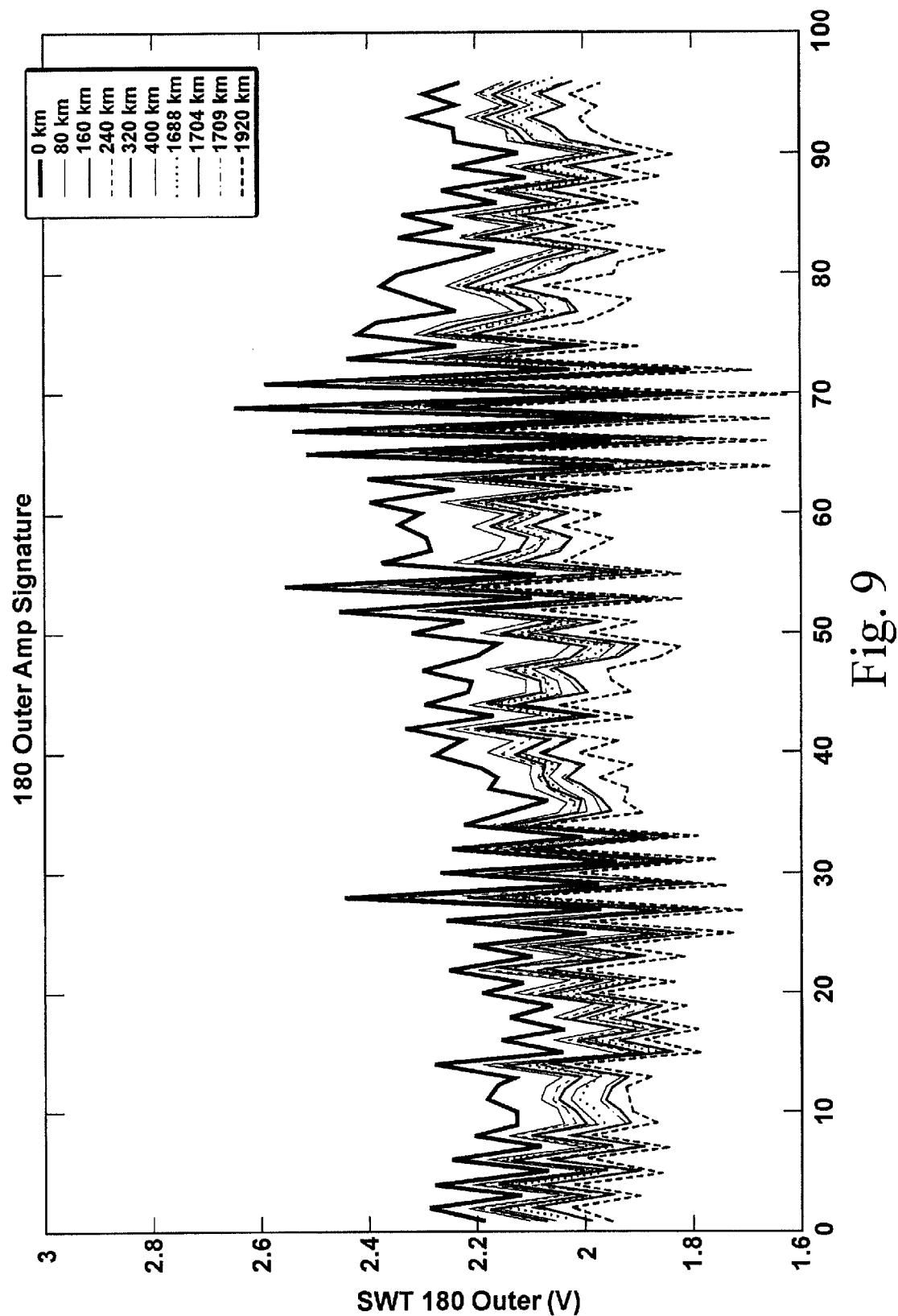
Figure 10:
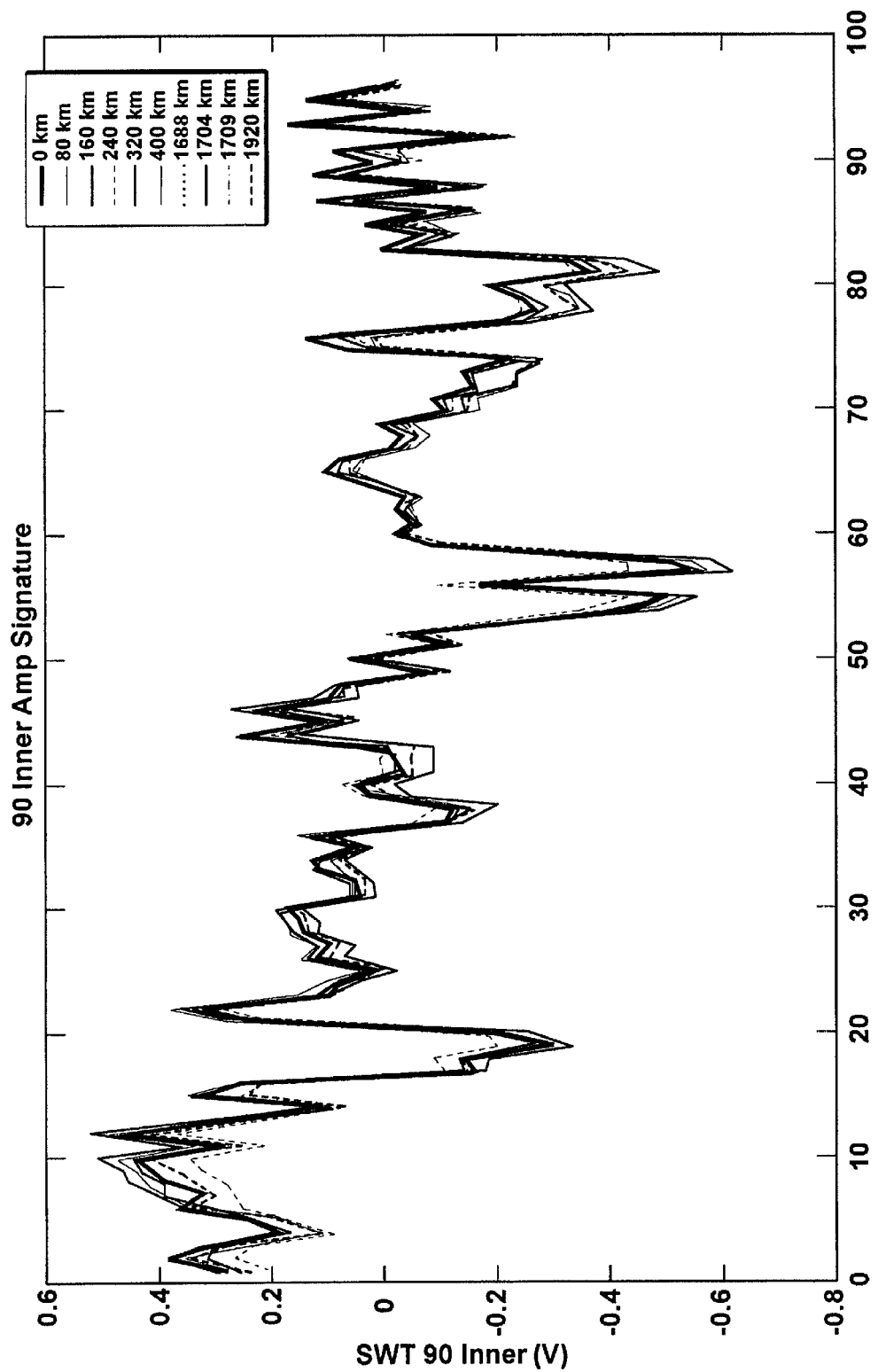
FIGS. 10–13 are data plots showing the plots of FIGS. 6–9 offset to a zero mean.
Figure 11:
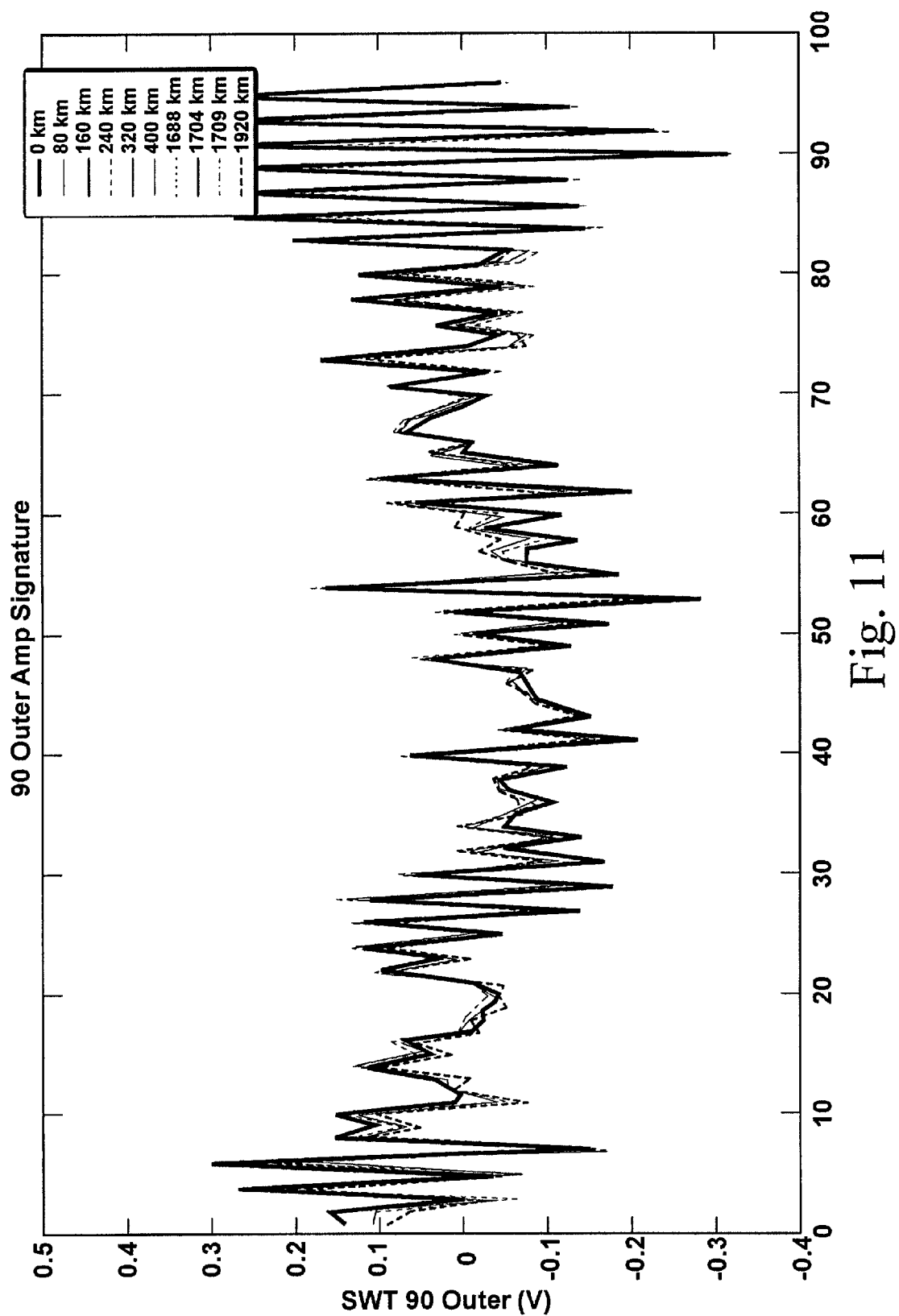
Figure 12:
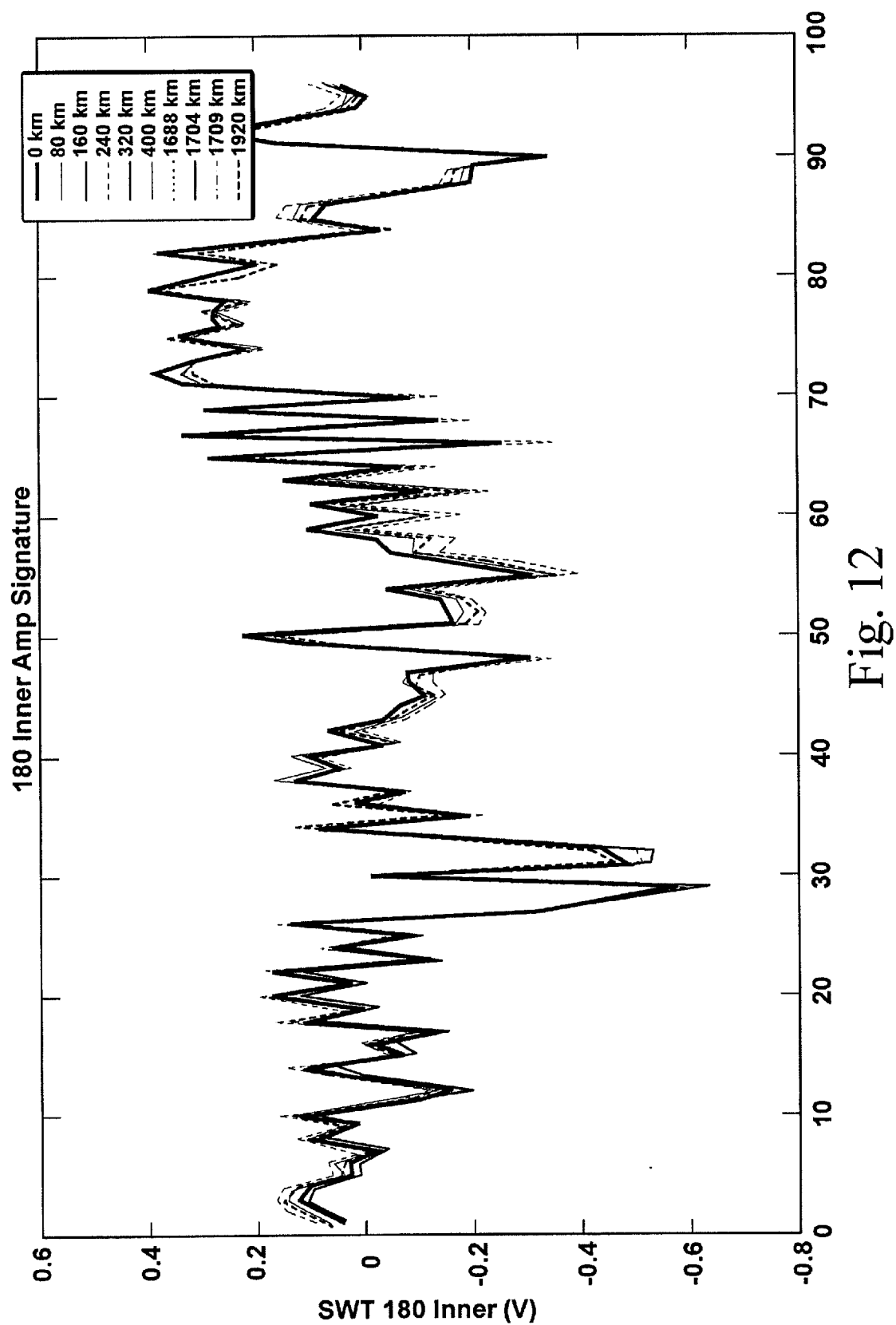
Figure 13:
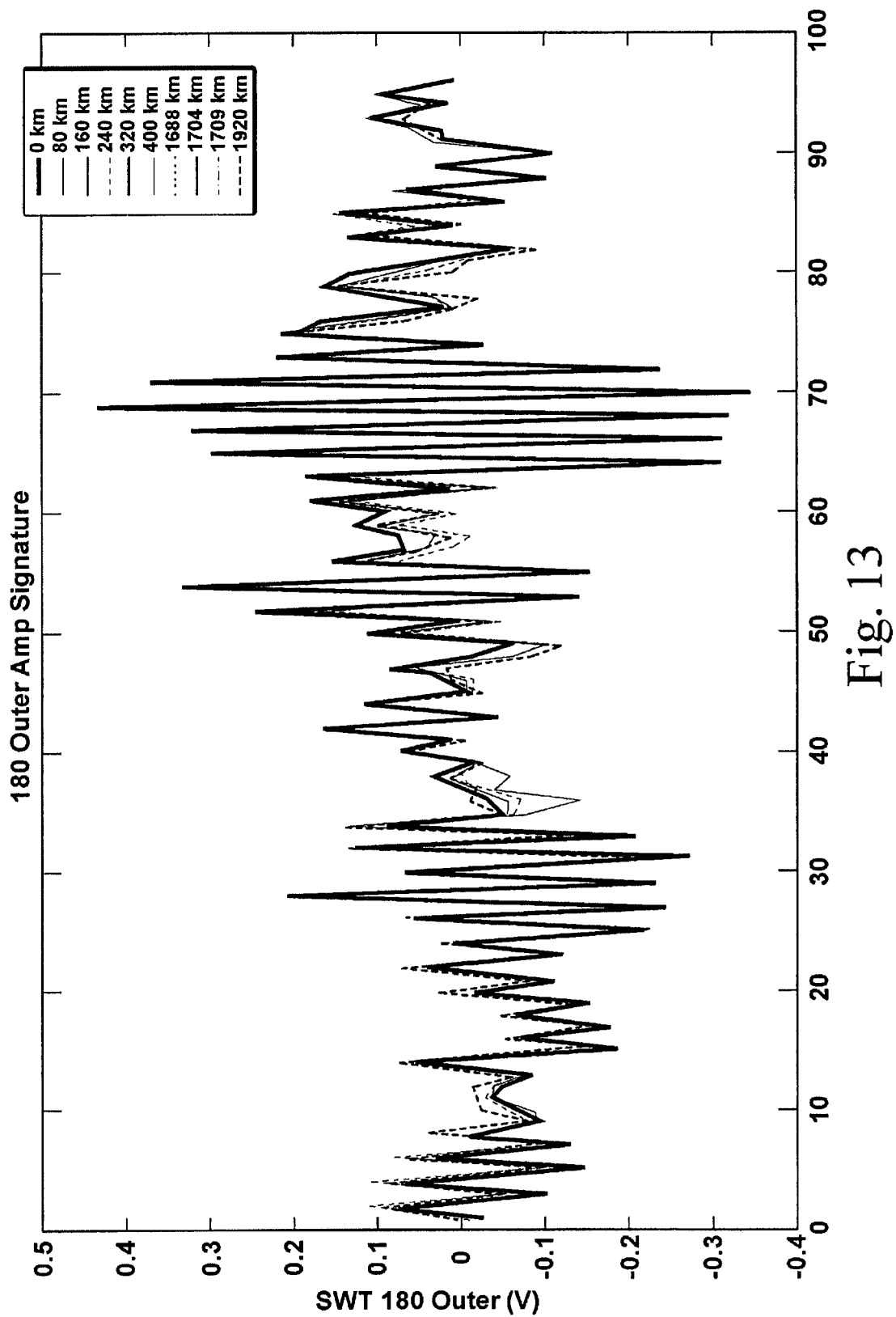
Figure 14:
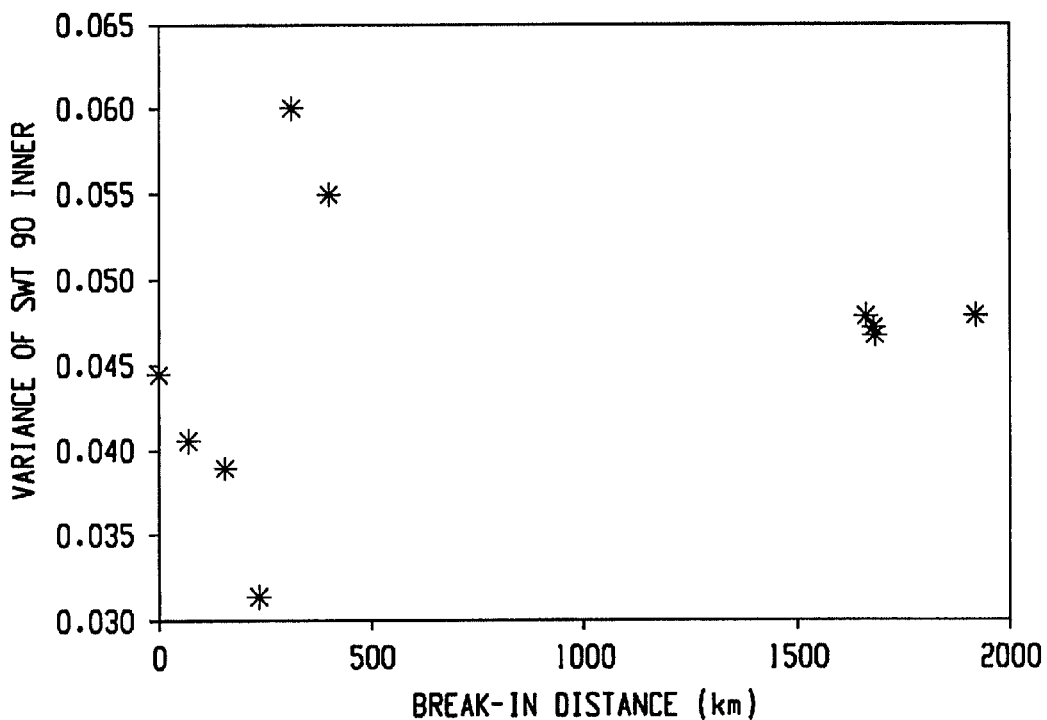
FIGS. 14–17 are variance scatter plots showing the variances of the plots of the zero mean signatures of FIGS. 10–13.
Figure 15:
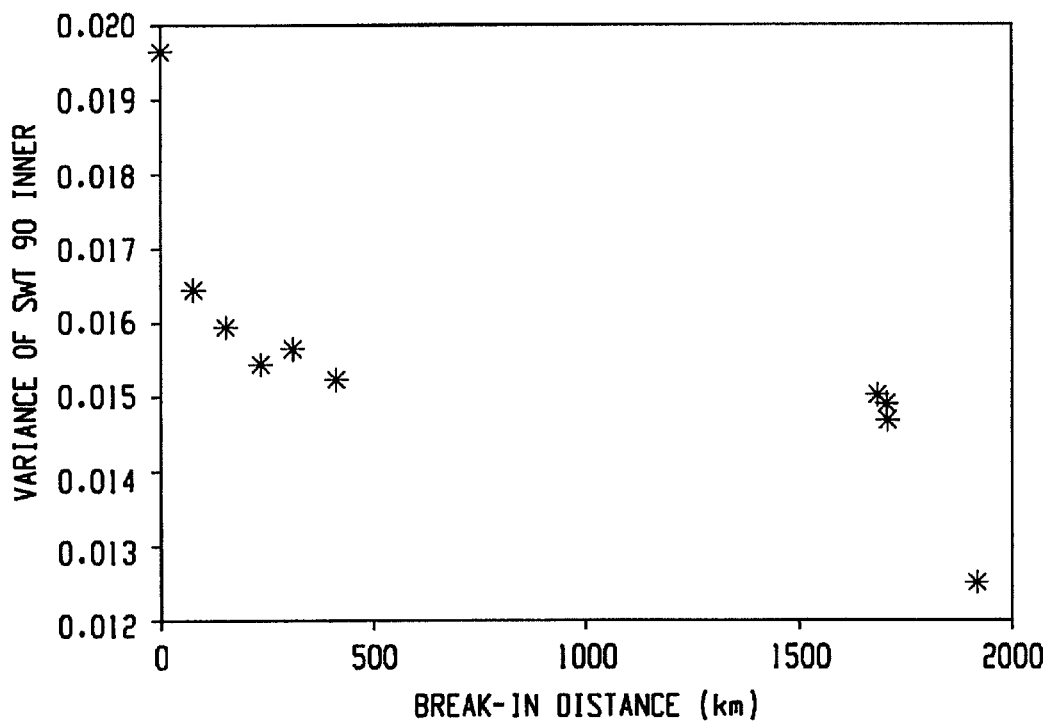
Figure 16:
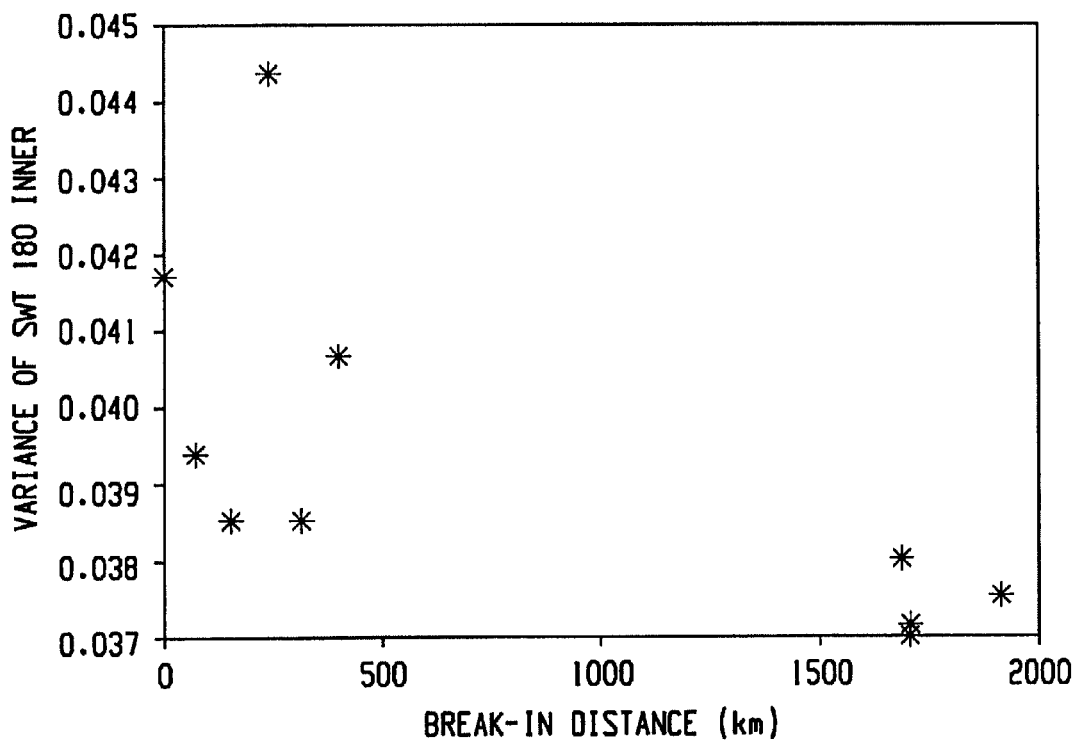
Figure 17:
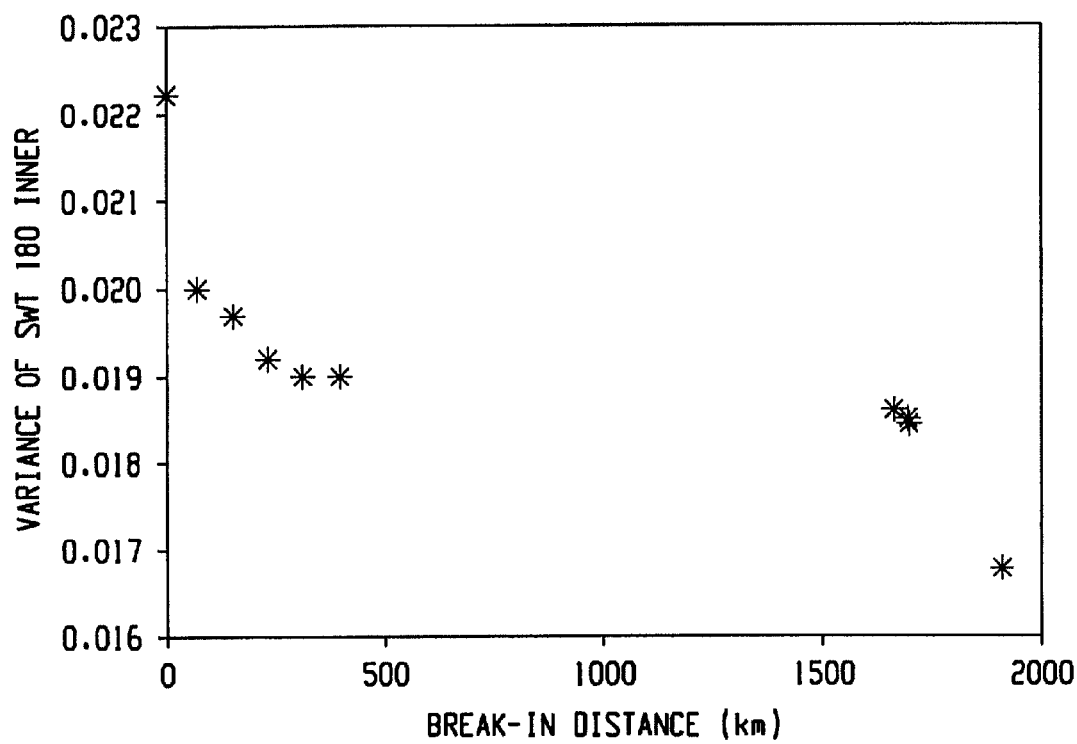

The magnetic signatures for these tires are very robust, especially after the break-in period for the tire. FIGS. 6–9 show pluralities of magnetic signature averages (data plots of average SWT sensor voltage amplitudes plotted against pole number around the circumference of the magnetized region of the tire) taken at various break-in mileages (0 to 1920 kilometers) for a tire. The tire used to collect the data shown in FIGS. 6–9 is a P275/60R17 tire with a sidewall modified with the addition of magnetic particles (strontium ferrite). The tire was subsequently magnetized so that it contained 48 North-South magnetic pole pairs for a total of 96 magnetic poles and tested on a treadwear test machine. Each of the ten plots in each of FIGS. 6–9 shows the average value of ten signatures (ten tire revolutions) for that tire, that is, the sensor voltage amplitude for each pole for each tire for each mileage is sampled ten times and averaged. FIG. 6 shows a plurality of average signatures at ten different break-in mileages for an SWT sensor located at the 90° inner position (not shown). FIG. 7 shows a plurality of average signatures at ten different break-in mileages for an SWT sensor located at the 90° outer position (not shown). FIG. 8 shows a plurality of average signatures at ten different break-in mileages for an SWT sensor located at the 180° inner position (e.g., position of sensor 28). FIG. 9 shows a plurality of average signatures at ten different break-in mileages for an SWT sensor located at the 180° outer position (e.g., position of sensor 26). FIGS. 10–13 show the plots of FIGS. 6–9 offset to a zero mean by subtracting the DC offset for each of the ten plots in each Figure. More specifically, the mean for each plot is calculated and this mean for each plot is subtracted from that plot. As can be seen from inspection of the zero mean plots of FIGS. 10–13, as the tire is broken in, there is very little change in signature, other than changes in DC offset (which change in DC offset is to be expected as the tire "grows" during break-in). This is confirmed by FIGS. 14–17, which are variance scatter plots showing the variances of the plots of FIGS. 10–13. Although the signatures of FIGS. 6–9 are during the break-in period, the magnetic signatures of tires remain very stable after the break-in period, even after extended road tests.

In very broad terms, the present invention is directed toward the real-time determination of magnetic tire signatures and comparing those magnetic signatures with stored signatures that represent an undamaged tire (or an acceptable tire), and if the deviation of a measured signature from a stored signature is too large, then concluding that there has been a change in tire status and taking appropriate action (e.g., warning the driver via the message center 36, or causing the control unit 32 on the vehicle to reduce engine speed and/or brake the vehicle, as discussed above).

More specifically, the tire status detection unit 22 analyzes one or more tire magnetic signatures in real time (i.e., reasonably contemporaneously and not requiring post-processing at a separate location) to determine whether a structural change in one or more tires has taken place. This includes the tire status detection unit 22 discriminating between changes in signatures that indicate a structural change in a tire with changes in signatures caused by other factors, such as forces acting on the vehicle (e.g., during cornering), forces acting on a single tire (e.g., one tire hitting an obstacle, such as the lip of a "pot hole"), the tire "growing" during break-in, etc. Forces acting on a vehicle will typically be intermittent ("coming and going at intervals; not continuous") and will affect a plurality of tires. Forces acting on a single tire will also typically be intermittent. Changes in signature during break-in typically affect the entire signature (i.e., manifest themselves as a DC offset in magnetic sensor voltage), as discussed above. Thus, in general, a repeatable, localized change in signature for one tire indicates a structural change to that tire. By a "repeatable" it is meant that the change in signature either stays substantially the same or becomes worse (greater and greater deviation from a baseline), e.g., FIG. 26. By a "localized change" it is meant that the change in signature occurs over one portion of the signature but not another, or the change is much more dramatic in one portion of the signature than in another portion (as contrasted with a relatively uniform change for the entire signature, such as a DC offset for the entire signature or as one might find during a sustained cornering event).

Moreover, it was determined that a structural change (a change in elastic properties, e.g., a puncture) on one side can be detected as a repeatable, localized change in signature on the other side of the tire. More specifically, visualizing a tire as a plurality of radially oriented, approximately U-shaped cross-sectional slices, a structural change anywhere on a slice will result in a repeatable, localized change in magnetic signature of the magnetized sidewall at that slice.

Therefore, to detect a change in tire status, the tire status detection unit 22 analyzes in real time one or more tire magnetic signatures to detect a repeatable, localized change in signature for one tire, which indicates a structural change to that tire.

Figure 18:
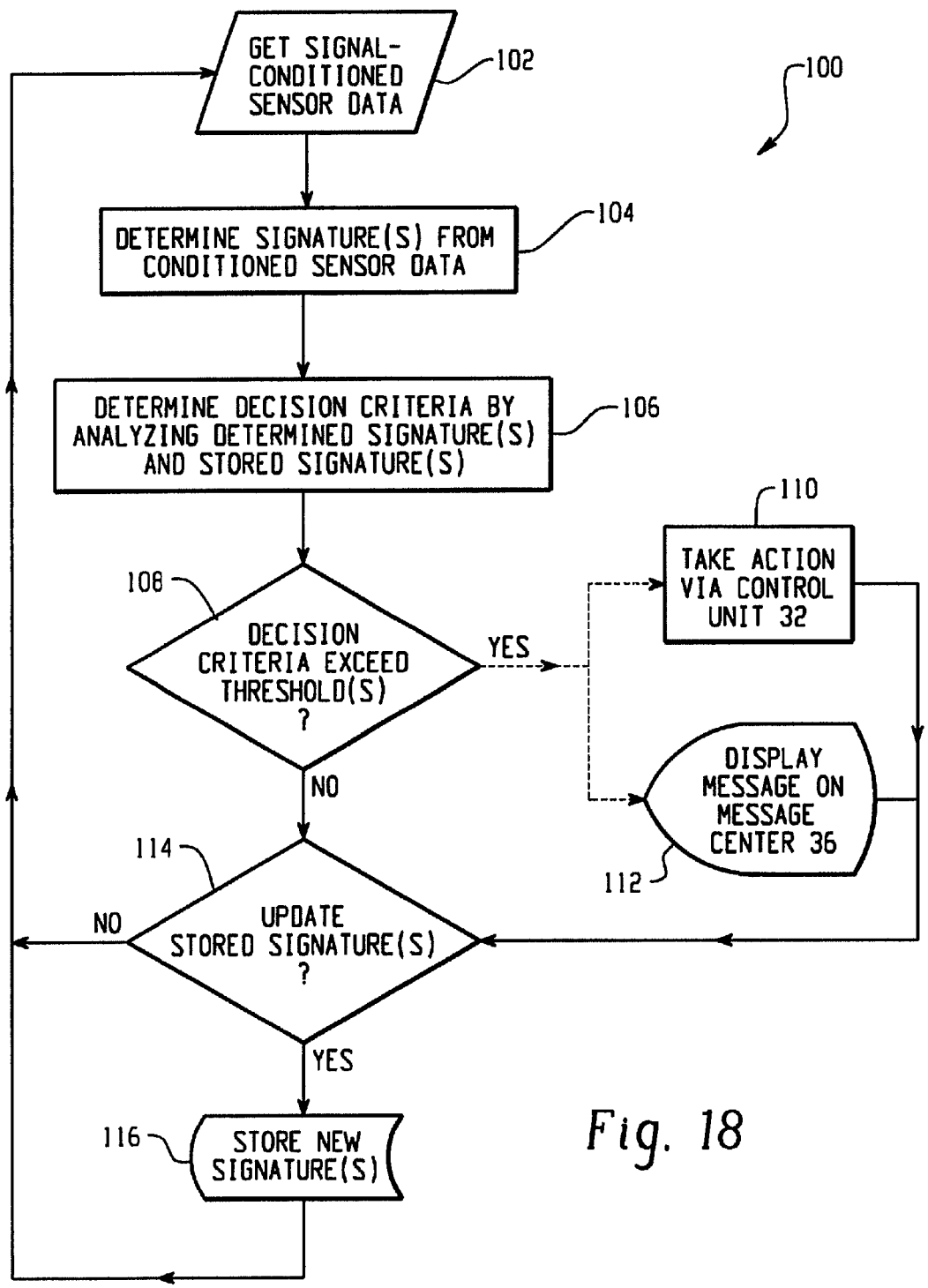
FIG. 18 is a high level flow chart showing generally the code executed by the tire status detection unit of the present invention.

FIG. 18 is a high-level flow chart showing generally the code 100 executed by the tire status detection unit 22 of the present invention. Initially, signal conditioned sinusoidal SWT sensor data must be collected from sensors 26, 28, at step 102. Data is collected, for example, at between 25,000 and 75,000 samples per second. In the alternative, zero-crossings can be used as post-triggers (and/or pre-triggers) to determine the peak amplitude for each pole. It is important that the signature represent data collected from a common reference point with respect to the stored signature(s), e.g., a common pole. This pole will be referred to as pole 0. Of course, the measured signature can be shifted with respect to the stored signature. Pole 0 is preferably located by doing a least squares fit for all 96 (or n) possible alignments with respect to the stored signature(s). The alignment with the lowest least squares residuals corresponds to the same alignment as the stored signature.

Next, at step 104, the signal conditioned sinusoidal SWT sensor data is processed to determine the calculate the magnetic signature(s). In the preferred embodiment, the phase difference between the two sensors 26, 28 (or 26' or 28') and the two amplitudes are calculated from the peaks and zero-crossings of the signal conditioned SWT sensor data.

More specifically, (a) the phase difference is determined as follows: (i) the mean value is subtracted from all the data, (ii) at each peak region and at each valley region a polynomial is fit along the peak or valley, (iii) the maximum/minimum of the resulting polynomial is determined (by, e.g., setting the differential to zero to determine the horizontal tangent), (iv) the time of a peak/valley of one signal is subtracted from the time of the peak/valley of the other signal, and (v) the resulting difference is divided by the corresponding "half-period" (the time from the previous peak/valley to that valley/peak) to make the phase difference independent of vehicle velocity;

(b) the amplitude of the signal from the outer SWT sensor 26 is determined as follows: (i) the mean value is subtracted from all data from sensor 26, (ii) at each peak region and at each valley region a polynomial is fit along the peak or valley, (iii) the maximum/minimum of the resulting polynomial is determined (by, e.g., setting the differential to zero to determine the horizontal tangent), (iv) the processed signal is rectified (by, e.g., taking the absolute value of each data point), and (v) the amplitude of the fit polynomial at each maximum is used as the amplitude of that signal;

(c) the amplitude of the signal from the inner SWT sensor 28 is determined as follows: (i) the mean value is subtracted from all data from sensor 28, (ii) at each peak region and at each valley region a polynomial is fit along the peak or valley, (iii) the maximum/minimum of the resulting polynomial is determined (by, e.g., setting the differential to zero to determine the horizontal tangent), (iv) the processed signal is rectified (by, e.g., taking the absolute value of each data point), and (v) the amplitude of the fit polynomial at each maximum is used as the amplitude of that signal;

The sinusoidal nature of the signals from the sensors facilitates using the fit polynomial in place of the actual sensor data. Additionally, using the fit polynomial for the phase and amplitude inputs tends to smooth or remove any noise that might otherwise cause erroneous calculations.

Next, at 106, decision criteria are determined by analyzing at least one amplitude or phase signature determined at task 104 (and, in the alternative, more than one amplitude signature and the phase signature) and corresponding stored signature(s). For example, it is believed that the statistical variance of one amplitude or phase signature may be used to detect a change in tire status. Although it is believed that a single statistical variance value (calculated in the standard manner) representing the statistical variance in amplitude or phase for all 96 poles can provide an indication of an imminent tread separation, the specific decision criteria used in this task 106 may vary from tire to tire, depending on the specific construction of the tire, and may vary depending on which failure modes are to be detected. One may also use the standardized normalized residuals (calculated in the standard manner). The use of multiple parameters and decision criteria are contemplated under the present invention. For example, a single variance value representing the variance in amplitude for all 96 poles above a predetermined threshold is particularly useful in indicating imminent failure when there is also an indication that there has been a localized change in tire signature, e.g., as indicated by a localized change in amplitude at one or more poles. Other possible decision criteria include, but are not limited to: harmonic analyses, Lorentz attractor plots, and harmonic distortion analyses.

Next, at task 108, the tire status detection unit 22 of the present invention determines whether any one or more of the decision criteria determined at step 106 exceed acceptable threshold(s). The particular threshold(s) used will vary from tire to tire, depending on the specific construction of that type of tire, and may vary depending on which failure modes are to be detected. The thresholds are preferably determined by collecting data from tires as they undergo particular failure modes, as discussed in more detail below.

If the decision criteria determined at step 106 exceed acceptable threshold(s), then the system of the present invention preferably takes action via control unit 32, at 110, and/or provides a visual and/or audible and/or other indications to the driver, at task 112. At task 110, taking action via one or more control units 32 (and associated actuators 34) can take many forms, e.g., one or more of the following: automatically limiting vehicle speed, automatically reducing the engine speed, automatically applying a braking force to slow the vehicle, decreasing steering sensitivity (e.g., with ESP), automatically placing one or more of the control units 32 (e.g., ESP, ABS, TSC, etc.) into a conservative mode of operation, and/or automatically placing one or more of the control units 32 (e.g., ARB) into a "high alert" mode of operation. At task 112, providing a visual and/or audible and/or other indication to the driver can also take many forms, such as (i) providing a warning that one or more tires are not adequately inflated, (ii) providing a warning that one or more tires has a normal load that exceeds an acceptable threshold, (iii) providing a warning that a catastrophic tire failure is imminent.

After performing task 110 and/or task 112, and if the decision criteria did not exceed acceptable thresholds at 108, the code next determines whether it is time to update the stored signature(s), at 114. This decision can be based on any one or more of a number of determined factors, e.g., a number of miles driven or revolutions since the stored signature(s) were last updated, an acceptable detected DC shift in signature above a threshold (acceptability being determined e.g., by there being no localized increase or decrease in signature amplitude), input from a user (e.g., by having the user press a button (not shown) in circuit communication with the tire status detection unit 22 for an extended period of time), and/or input via an external device 120, etc. If it is not time to update the stored signature(s), the code branches back up to task 102 to repeat the process 100 again. If so, then the code next calculates an average signature (e.g., an average of ten revolutions) and stores that signature in memory (not shown), at 116. Then, the code branches back up to task 102 to repeat the process 100 again.

Figure 19:
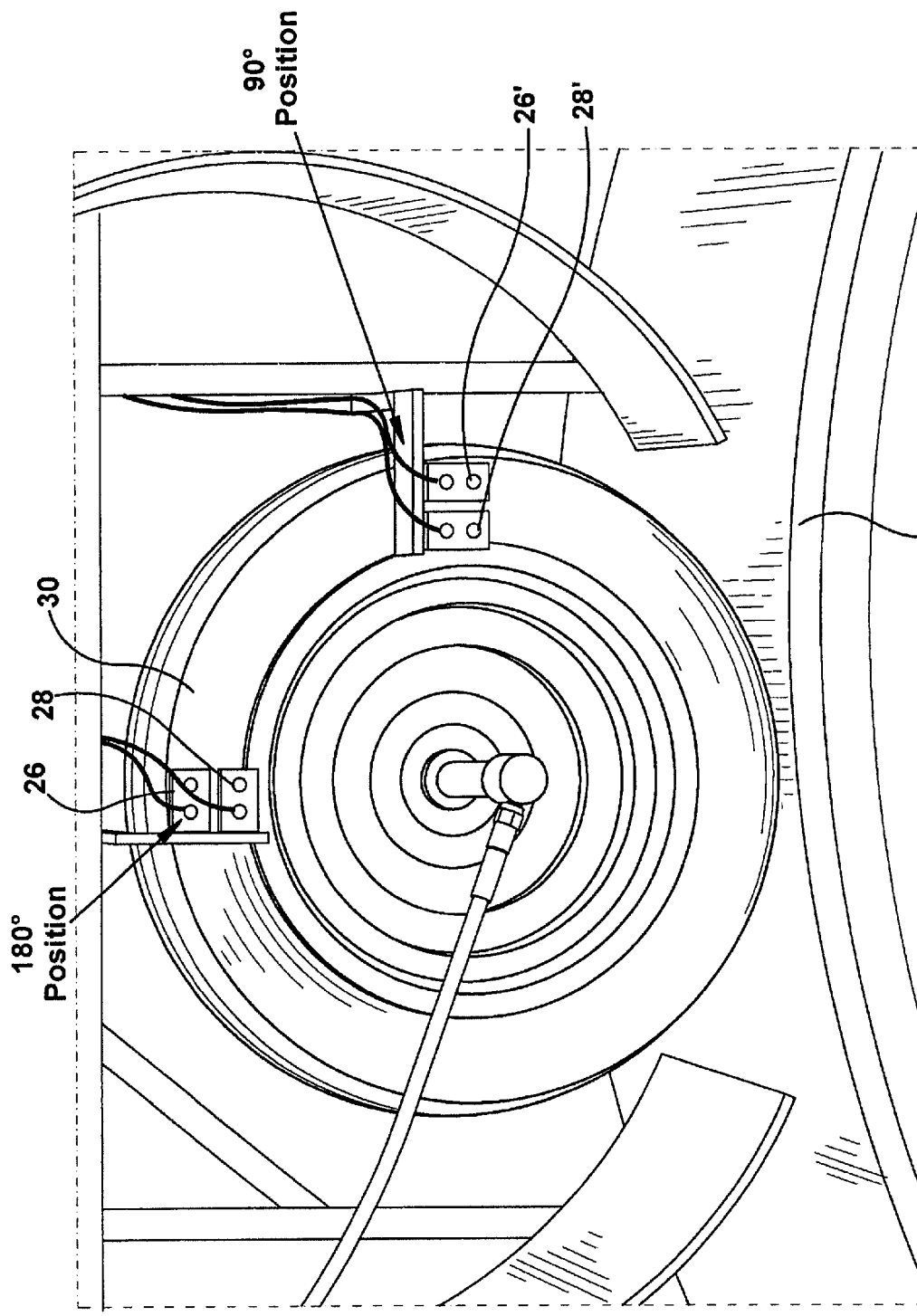
FIG. 19 shows a test setup on a dynamometer that was used to cause tires to fail and collect SWT signature data during failure.
Figure 20:
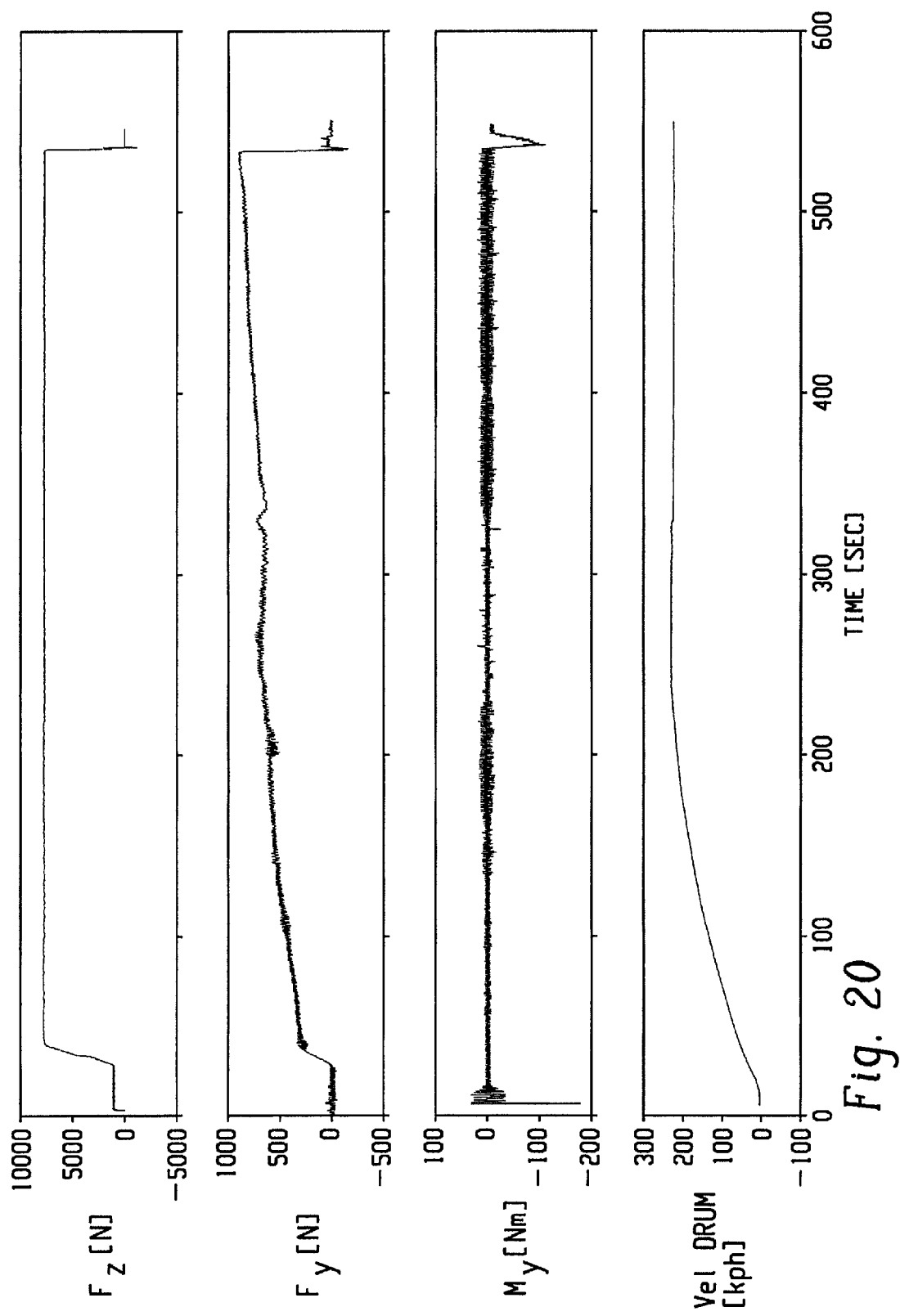
FIGS. 20 and 21 are data plots showing the test conditions for a particular tire caused to fail using the test setup of FIG. 19.
Figure 21:
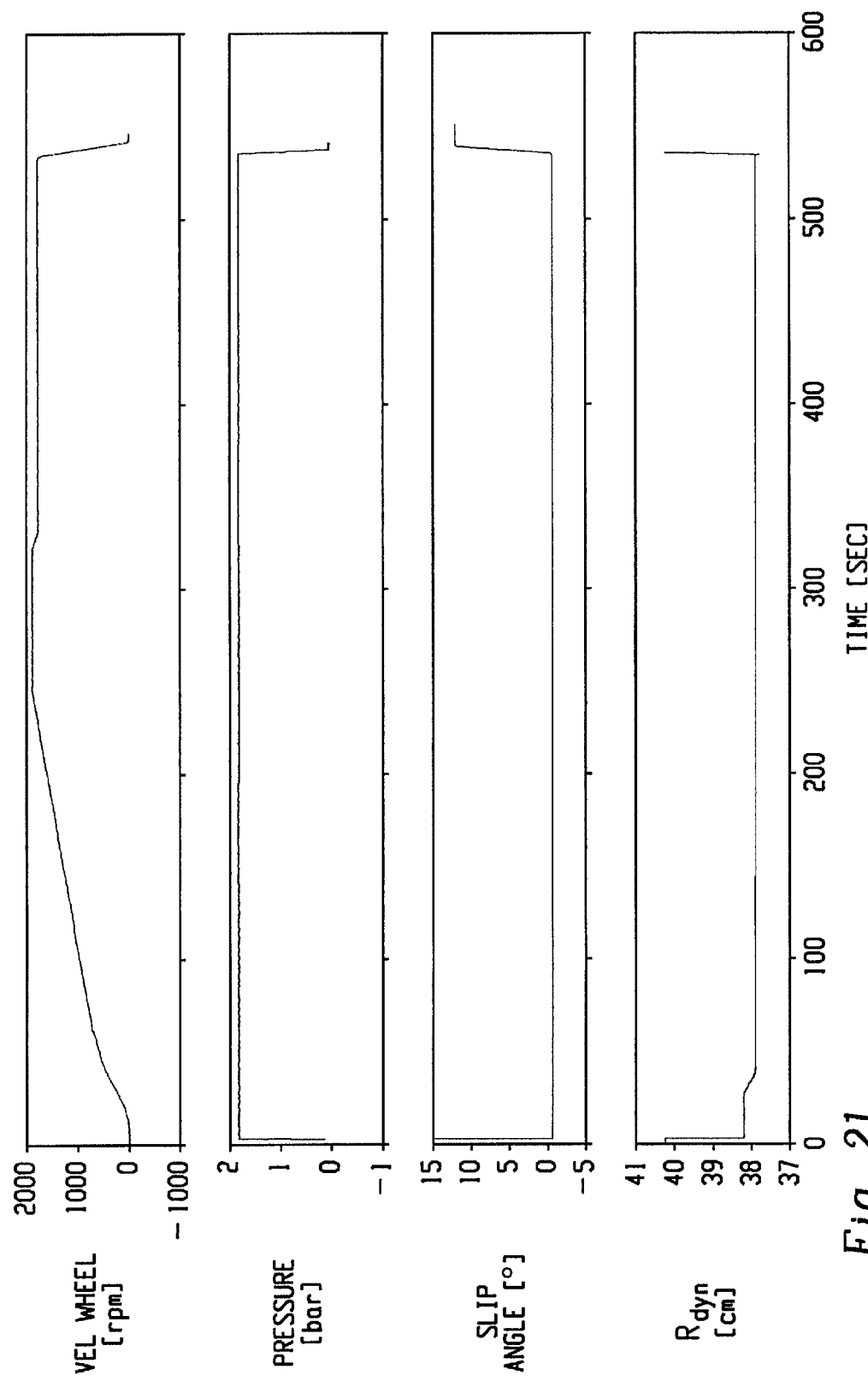
Figure 22:
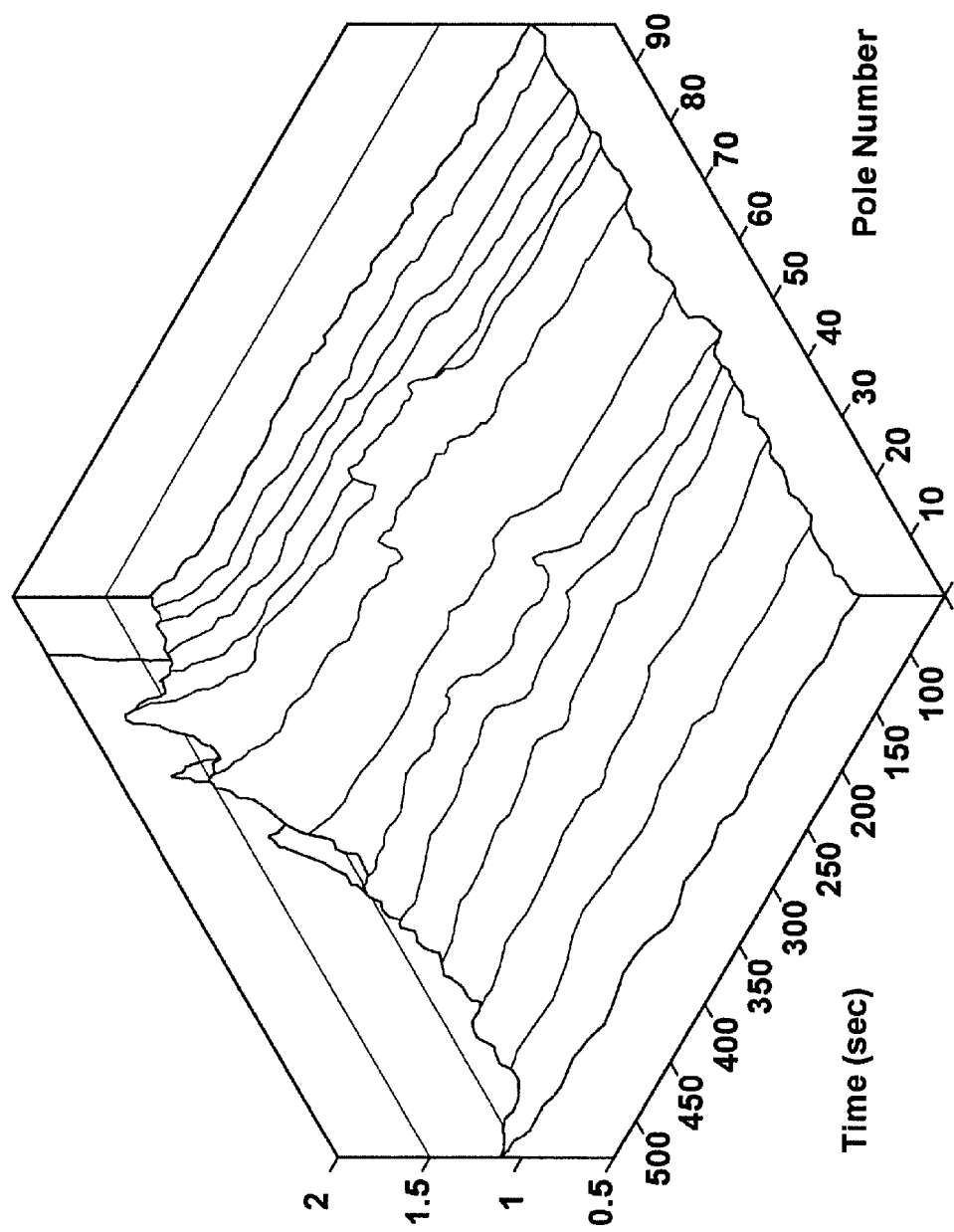
FIGS. 22–24 are waterfall plots showing SWT signature data over time for the tire caused to fail using the test setup of FIG. 19.
Figure 23:
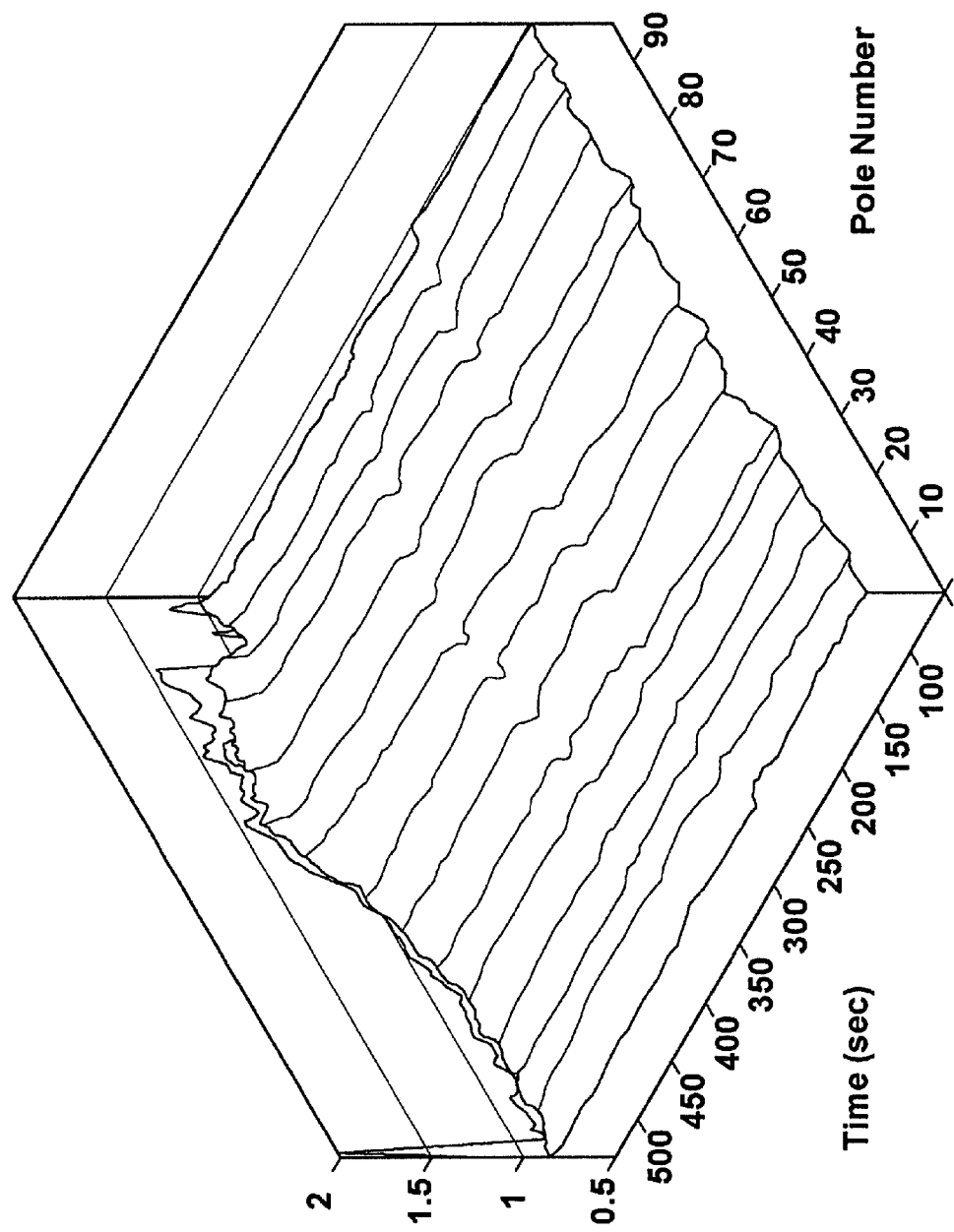
Figure 24:
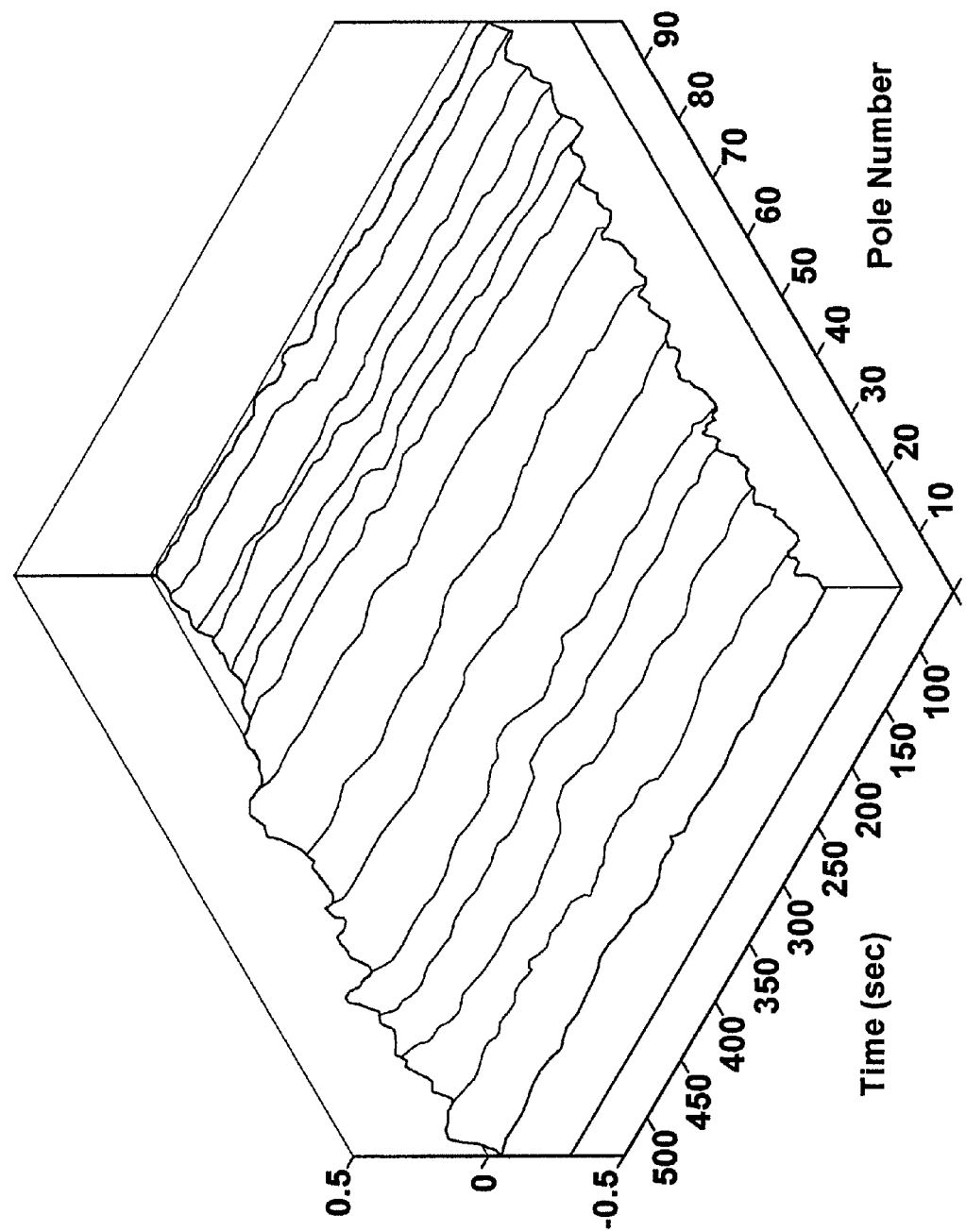
Figure 25:
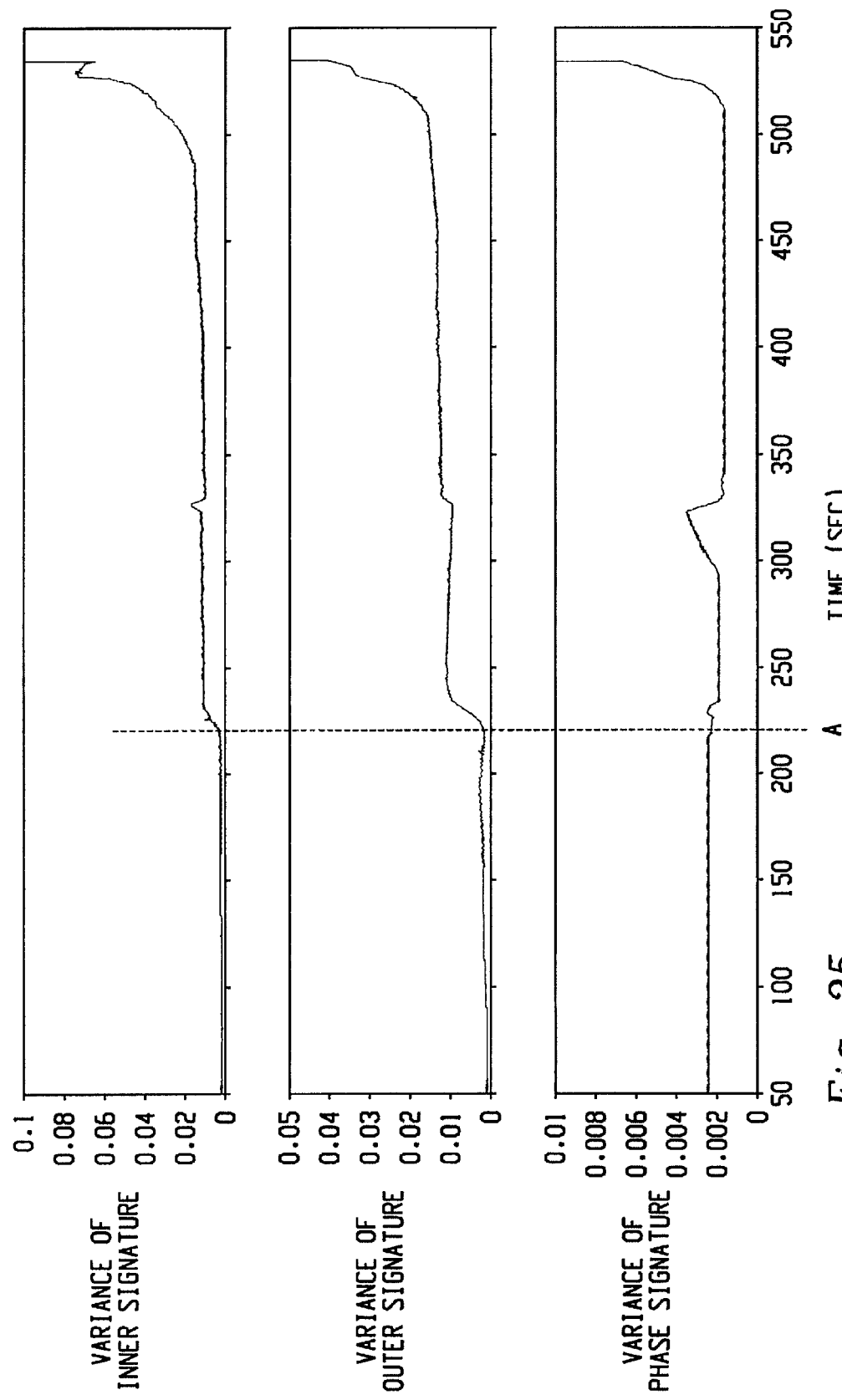
FIG. 25 shows data plots for various calculated parameters for the tire caused to fail using the test setup of FIG. 19.

In general, the thresholds used in step 108 are preferably determined by collecting SWT magnetic signature data from particular tires as they undergo particular failure modes. For example, tires can be manufactured with various flaws intentionally in them solely for testing and validation purposes, e.g., (i) having too thin of a rubber layer between ply belts, especially at the belt edges, (ii) applying a substance between the carcass and belt or between the two belt plys that would reduce the adhesion between the two layers, (iii) cutting a structural member, e.g., cutting a ply cord, etc., and SWT magnetic signature data can be collected from them as they fail. In addition, or in the alternative, ordinary tires or tires with known flaws can be made to fail by stressing them, e.g., by running them in an underinflated state, running them at excessively high speeds and/or running them while applying an excessively high normal force, and SWT magnetic signature data can be collected from them as they fail. FIG. 19 shows a test setup on a dynamometer that was used to cause tires to fail and collect SWT signature data during failure. A tire 30 was mounted in the dynamometer and a pair of SWT magnetic sensors 26, 28, 26', 28' were positioned at the 90° and 180° positions (3 o'clock and 12 o'clock, respectively). A drum 125 was used to run the tire 30 at excessive speeds (about 150 miles per hour (i.e., about 240 kph)) under a very high load (e.g., 1700 pounds (about 7500 N)). These and other test conditions for this tire are shown in FIGS. 20 and 21. In this tire, there was a catastrophic failure (in particular carcass rupture induced by initial belt edge tread separation) at about 540 seconds into the data shown in FIGS. 20 and 21. The procedure applied to this tire was essentially a modified step-speed endurance test. Both phase and amplitude signatures were measured at each position. In addition to the magnetic field data, vertical load in kN and tire speed in revolutions per second were collected at a sampling rate of 75,000 samples per second. Thirty seconds of data were collected and stored in a computer in five sequential files. Because one cannot predict when a tire will fail, after five files of data were collected, the sequence repeats starting with the first file. Thus, a continuous record of events traced back 150 seconds prior to tire failure was available. (A slight interruption occurred after every 30 seconds that depended on the time taken to write the file to hard disk and resume data collection.) Additionally, a microphone (not shown) was used to detect any sounds indicative of failure. FIGS. 22, 23, and 24 are waterfall plots showing SWT signature data over time as the tire failed. By inspection of FIGS. 22 and 23, it is apparent that the amplitude of the signatures for both the inner sensor 28 and the outer sensor 26 increased greatly leading up to the tire failure. Additionally, the change in signature appears to be growing worse and worse (more and more deviation from the baseline). FIG. 25 shows data plots for various calculated parameters for the tire as the tire failed. More specifically, FIG. 25 shows the variance of the signature amplitude for the inner sensor 28 over time, the variance of the signature amplitude for the outer sensor 26 over time, and the variance of the phase signature over time. Notice that both of the variances of the signature amplitudes exhibit a marked increase at about 230 seconds (point "A") into the data and rise sharply just prior to the catastrophic failure. It is important to note that with this particular tire, the carcass rupture occurred on the side of the tire 30 opposite where the sensors 26, 28, 26', 28' were located, yet a change in signature on the side with the sensors was detected.

Figure 26:
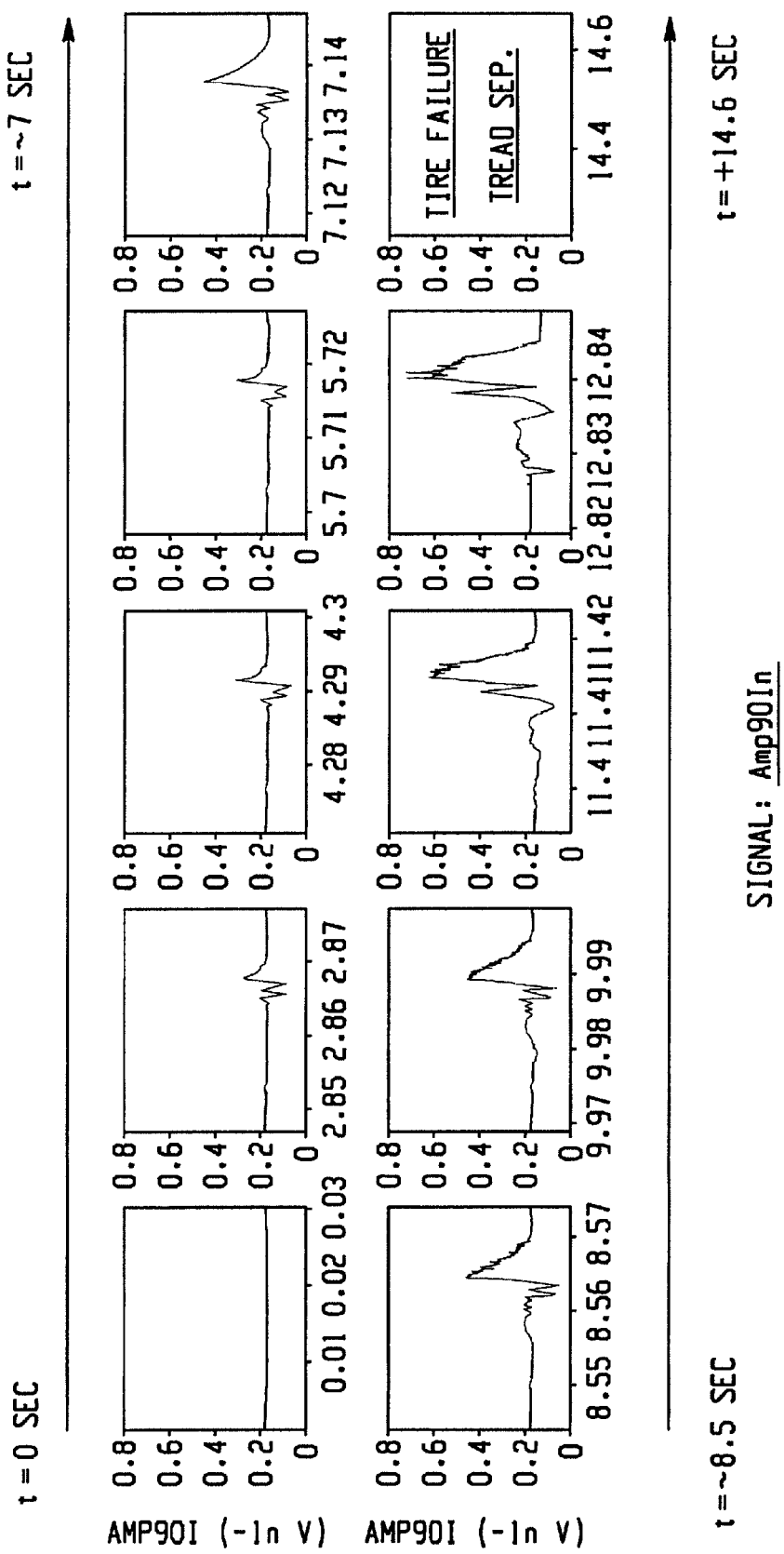
FIG. 26 shows a series of nine SWT magnetic signatures just prior to failure by tread separation for a tire.

As another example, FIG. 26 shows a series of nine SWT magnetic signatures just prior to failure by tread separation for a tire. The data in FIG. 26 were taken from the 90 degree, inner sensor position 28'. Each frame in FIG. 26 shows a single tire revolution, thus a single SWT amplitude signature, starting at the times indicated on the horizontal axes in seconds. The data in FIG. 26 has been adjusted by subtracting the common signature (e.g., a stored signature) from each of the signatures. Tire failure due to tread separation occurred at approximately 14 seconds into this data. A marked change in the signature from the base line (shown in the first frame) can be clearly seen at the 2.86 second mark in the second frame and grows with each successive frame, presumably corresponding to the growth of the tread separation. Notice that there is a repeatable, localized change in signature shown in FIG. 26. Additionally, the change in signature appears to be growing worse and worse (more and more deviation from the baseline).

The system of the present invention can also be used to determine tire pressure and changes in tire pressure. In this application, preferably at least one SWT sensor 26 is used for each tire on the vehicle. Tire pressure can be measured using magnetic SWT signatures because the contour of a tire's sidewall changes as a function of tire pressure. Thus, a change in tire pressure can be detected as a positive or negative DC shift in magnetic signature mean, as the sidewall moves either toward or away from the sensors, depending on whether pressure is increasing or decreasing. Other factors can affect the SWT signature mean, e.g., cornering forces (and other lateral forces), vehicle speed (the tire tends to flatten out as speed increases), etc.

In a simple tire pressure system of the present invention, the system would need to do tire pressure analyses (e.g., determining tire pressure or determining a change in tire pressure) while the vehicle is in a steady state, such as driving in a straight line, with no braking, no cornering, and no other changing lateral forces or normal forces. This information can be acquires by an ESP system or similar system, or from a system like the system taught in copending U.S. patent application Ser. No. 09/584,230, which uses SWT data to determine various forces and moments acting on each tire. In the alternative, or in addition thereto, a more complex tire pressure system of the present invention could do tire pressure analyses (e.g., determining tire pressure or a change in tire pressure) with various forces and moments acting on each tire by separating out the affects on SWT data caused by tire pressure from the effects on SWT data caused by other factors.

In general, tire pressure is determined by determining SWT magnetic signature mean values for each tire in real-time and using a multidimensional lookup table to calculate pressure for each tire. Of course, as known to those skilled in the art, the lookup table can be used in a process of calculating pressure; other steps in calculating pressure can include interpolating between discrete entries in the lookup table. The lookup table would preferably have stored therein a plurality of tire pressures as a function of (a) SWT signature mean (or other value derived from SWT data) and (b) vehicle speed. Other parameters can be used (e.g., normal load on each tire, in which case the lookup table would store a plurality of tire pressures as a function of (a) SWT signature mean (or other value derived from SWT data), (b) vehicle speed, and (c) normal load). If measured tire pressure falls below a predetermined threshold pressure or begins falling at or beyond an acceptable rate, as discussed above, the message center 36 can provide visual and/or audible and/or other indications to a driver that one or more tires are not adequately inflated or are leaking.

In addition, or in the alternative, a change in tire pressure can be detected without determining an absolute pressure value by calculating and storing a baseline signature mean value for each tire, collecting SWT data in real-time, determining signature mean values for each tire in real-time, and comparing determined signature mean values from stored baseline signature mean values. A deviation from signature mean for one tire would be interpreted as a loss of pressure for that tire.

Tests indicate that changes on the order of 5 p.s.i. can be detected using SWT data. Using a test vehicle instrumented with SWT sensors for each tire, with each tire having an instrumented hub (e.g., Model 242 electronics and Model 6613 wheel sensor, both from GSE, Inc., measuring three orthogonal forces and three moments acting on each tire) and having the added capability to inflate and deflate the tire dynamically, and measure tire pressure with a pressure sensor, the inflation pressure was varied dynamically while vehicle was moving at various speeds. For example, for each of the speeds of 20 mph, 30 mph, 40 mph, 50 mph, 60 mph, 70 mph, tire pressure was initially set at 60 psi and bled down to about 15 psi over a period of about one to two minutes while driving at each of those speeds. Analysis of the data collected indicate that changes on the order of 5 p.s.i. can be detected using SWT data. Such data would also be used to generate the lookup table used to convert SWT data and speed data (and possibly other parameters, such as normal load) to an absolute pressure for each tire (or to some other value related to tire pressure), as described above.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the SWT sensors described herein have an analog current output; in the alternative, sensors having outputs in the frequency domain might be used in a system made in accordance with the teachings of the present invention. In addition, the SWT sensors described herein are magnetic sensors; other sidewall torsion sensors might be used in a system made in accordance with the teachings of the present invention. Additionally, the term "signature" as used herein was typically used to represent data corresponding to a single revolution of a tire; the term need not be so limited and can also mean more than or less than a single revolution. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method for detecting changes in status of a tire in real time, comprising the steps of:
   (a) providing at least one sensor having an output relating to the length of a changing air gap between the at least one sensor and a sidewall of the tire;
   (b) providing a stored signature including a plurality of data;
   (c) reading from the at least one sensor a measured signature including a plurality of data collected from the at least one sensor;
   (d) determining from the stored signature and the measured signature a deviation value representing a deviation between the stored signature and the measured signature; and
   (e) determining from the deviation value and a predetermined threshold whether the tire status has changed.

2. The method for detecting changes in status of a tire in real time according to claim 1, wherein said step of determining from the deviation value and a predetermined threshold whether the tire status has changed comprises the step of determining from the deviation value and a predetermined threshold whether a catastrophic tire failure is imminent.

3. The method for detecting changes in status of a tire in real time according to claim 2, further comprising the step of providing a warning that a change in tire status has occurred.

4. The method for detecting changes in status of a tire in real time according to claim 1, wherein said step of determining from the deviation value and a predetermined threshold whether the tire status has changed comprises the step of determining from the deviation value and a predetermined threshold whether a structural change to the tire has occurred.

5. The method for detecting changes in status of a tire in real time according to claim 4, further comprising the step of providing a wanting that a change in tire status has occurred.

6. The method for detecting changes in status of a tire in real time according to claim 1, wherein said step of determining from the deviation value and a predetermined threshold whether the tire status has changed comprises the step of determining from the deviation value and a predetermined threshold whether a change in tire pressure has occurred.

7. The method for detecting changes in status of a tire in real time according to claim 6, further comprising the step of providing a warning that a change in tire status has occurred.

8. The method for detecting changes in status of a tire in real time according to claim 1, further comprising the step of providing a warning that a change in tire status has occurred.

9. A system for detecting changes in status of a tire in real time, comprising the steps of:
   (a) means for providing at least one sensor having an output relating to the length of a changing air gap between the at least one sensor and a sidewall of the tire;
   (b) means for providing a stored signature including a plurality of data;
   (c) means for reading from the at least one sensor a measured signature including a plurality of data collected from the at least one sensor;
   (d) means for determining from the stored signature and the measured signature a deviation value representing a deviation between the stored signature and the measured signature; and
   (e) means for determining from the deviation value and a predetermined threshold whether the tire status has changed.

10. The system for detecting changes in status of a tire in real time according to claim 9, wherein said means for determining from the deviation value and a predetermined threshold whether the tire status has changed comprises means for determining from the deviation value and a predetermined threshold whether a catastrophic tire failure is imminent.

11. The system for detecting changes in status of a tire in real time according to claim 10, further comprising means for providing a warning that a change in tire status has occurred.

12. The system for detecting changes in status of a tire in real time according to claim 9, wherein said means for determining from the deviation value and a predetermined threshold whether the tire status has changed comprises means for determining from the deviation value and a predetermined threshold whether a structural change to the tire has occurred.

13. The system for detecting changes in status of a tire in real time according to claim 12, further comprising means for providing a warning that a change in tire status has occurred.

14. The system for detecting changes in status of a tire in real time according to claim 9, wherein said means for determining from the deviation value and a predetermined threshold whether the tire status has changed comprises means for determining from the deviation value and a predetermined threshold whether a change in tire pressure has occurred.

15. The system for detecting changes in status of a tire in real time according to claim 14, further comprising means for providing a warning that a change in tire status has occurred.

16. The system for detecting changes in status of a tire in real time according to claim 9, further comprising means for providing a warning that a change in tire status has occurred.

17. A method for detecting in real time changes in status of a tire on a vehicle having at least one other tire, comprising the steps of:
   (a) providing at least one sensor having an output relating to the length of a changing air gap between the at least one sensor and a sidewall of the tire;
   (b) providing at least one other sensor having an output relating to the length of a changing air gap between the at least one other sensor and a sidewall of the at least one other tire;
   (c) reading from the at least one sensor a measured signature including a plurality of data collected from the at least one sensor;
   (d) reading from the at least one other sensor at least one other measured signature including a plurality of data collected from the at least one other sensor;
   (e) determining from the measured signature and from the at least one other measured signature a deviation value representing a deviation between the measured signature and the at least one other measured signature; and
   (f) determining from the deviation value and a predetermined threshold whether status of the tire has changed.

18. The method for detecting changes in status of a tire in real time according to claim 17, wherein said step of determining from the deviation value and a predetermined threshold whether the tire status has changed comprises the step of determining from the deviation value and a predetermined threshold whether a catastrophic tire failure is imminent.

19. The method for detecting changes in status of a tire in real time according to claim 18, further comprising the step of providing a warning that a change in tire status has occurred.

20. The method for detecting changes in status of a tire in real time according to claim 17, wherein said step of determining from the deviation value and a predetermined threshold whether the tire status has changed comprises the step of determining from the deviation value and a predetermined threshold whether a structural change to the tire has occurred.

21. The method for detecting changes in status of a tire in real time according to claim 20, further comprising the step of providing a warning that a change in tire status has occurred.

22. The method for detecting changes in status of a tire in real time according to claim 17, wherein said step of determining from the deviation value and a predetermined threshold whether the tire status has changed comprises the step of determining from the deviation value and a predetermined threshold whether a change in tire pressure has occurred.

23. The method for detecting changes in status of a tire in real time according to claim 22, further comprising the step of providing a warning that a change in tire status has occurred.

24. The method for detecting changes in status of a tire in real time according to claim 17, further comprising the step of providing a warning that a change in tire status has occurred.

25. A system for detecting in real time changes in status of a tire on a vehicle having at least one other tire, comprising the steps of:
  (a) means for providing at least one sensor having an output relating to the length of a changing air gap between the at least one sensor and a sidewall of the tire;
  (b) means for providing at least one other sensor having an output relating to the length of a changing air gap between the at least one other sensor and a sidewall of the at least one other tire;
  (c) means for reading from the at least one sensor a measured signature including a plurality of data collected from the at least one sensor;
  (d) means for reading from the at least one other sensor at least one other measured signature including a plurality of data collected from the at least one other sensor;
  (e) means for determining from the measured signature and from the at least one other measured signature a deviation value representing a deviation between the measured signature and the at least one other measured signature; and
  (f) means for determining from the deviation value and a predetermined threshold whether status of the tire has changed.

26. The system for detecting changes in status of a tire in real time according to claim 25, wherein said means for determining from the deviation value and a predetermined threshold whether the tire status has changed comprises means for determining from the deviation value and a predetermined threshold whether a catastrophic tire failure is imminent.

27. The system for detecting changes in status of a tire in real time according to claim 26, further comprising means for providing a warning that a change in tire status has occurred.

28. The system for detecting changes in status of a tire in real time according to claim 25, wherein said means for determining from the deviation value and a predetermined threshold whether the tire status has changed comprises means for determining from the deviation value and a predetermined threshold whether a structural change to the tire has occurred.

29. The system for detecting changes in status of a tire in real time according to claim 28, further comprising means for providing a warning that a change in tire status has occurred.

30. The system for detecting changes in status of a tire in real time according to claim 25, wherein said means for determining from the deviation value and a predetermined threshold whether the tire status has changed comprises means for determining from the deviation value and a predetermined threshold whether a change in tire pressure has occurred.

31. The system for detecting changes in status of a tire in real time according to claim 30, further comprising means for providing a warning that a change in tire status has occurred.

32. The system for detecting changes in status of a tire in real time according to claim 25, further comprising means for providing a warning that a change in tire status has occurred.

33. A method for determining tire pressure in real time, comprising the steps of:
  (a) providing at least one sensor having an output relating to the length of a changing air gap between the at least one sensor and a sidewall of the tire;
  (b) reading from the at least one sensor data relating to a length of an air gap between the at least one sensor and a sidewall of the tire;
  (c) determining a measured pressure value for the tire from the data relating to a length of an air gap between the at least one sensor and a sidewall of the tire;
  wherein said step of determining a measured pressure value for the tire from the data relating to a length of an air gap between the at least one sensor and a sidewall of the tire comprises the steps of:
  (d) calculating a derived value relating to the length of the air gap between the at least one sensor and a sidewall of the tire; and
  (e) converting the derived value to the measured pressure value for the tire; and
  wherein said step of converting the derived value to the measured pressure value for the tire comprises the steps of:
  (f) providing a lookup table having stored values of tire pressure values as a function of at least a value relating to a length of an air gap between the at least one sensor and a sidewall of the tire; and
  (g) using said lookup table in a process of calculating the measured pressure value for the tire from the derived value.

34. A method for determining tire pressure in real time, comprising the steps of:
  (a) providing at least one sensor having an output relating to the length of a changing air gap between the at least one sensor and a sidewall of the tire;
  (b) reading from the at least one sensor data relating to a length of an air gap between the at least one sensor and a sidewall of the tire;
  (c) determining a measured pressure value for the tire from the data relating to a length of an air gap between the at least one sensor and a sidewall of the tire;

wherein said step of determining a measured pressure value for the tire from the data relating to a length of an air gap between the at least one sensor and a sidewall of the tire comprises the steps of:

(d) calculating a derived value relating to the length of the air gap between the at least one sensor and a sidewall of the tire; and (e) converting the derived value to the measured pressure value for the tire; and wherein said step of converting the derived value to the measured pressure value for the tire comprises the steps of:

(f) providing a lookup table having stored values of tire pressure values as a function of at least vehicle speed and a value relating to a length of an air gap between the at least one sensor and a sidewall of the tire; and (g) using said lookup table in a process of calculating the measured pressure value for the tire from the derived value.

35. A method for determining tire pressure in real time, comprising the steps of:

(a) providing at least one sensor having an output relating to the length of a changing air gap between the at least one sensor and a sidewall of the tire;

(b) reading from the at least one sensor data relating to a length of an air gap between the at least one sensor and a sidewall of the tire;

(c) determining a measured pressure value for the tire from the data relating to a length of an air gap between the at least one sensor and a sidewall of the tire;

wherein said step of determining a measured pressure value for the tire from the data relating to a length of an air gap between the at least one sensor and a sidewall of the tire comprises the steps of:

(d) calculating a derived value relating to the length of the air gap between the at least one sensor and a sidewall of the tire; and (e) converting the derived value to the measured pressure value for the tire; and wherein said step of converting the derived value to the measured pressure value for the tire comprises the steps of:

(f) providing a lookup table having stored values of tire pressure values as a function of at least load on the tire, vehicle speed, and a value relating to a length of an air gap between the at least one sensor and a sidewall of the tire; and (g) using said lookup table in a process of calculating the measured pressure value for the tire from the derived value.

* * * * *